US007769203B2

(12) United States Patent
Oohashi et al.

(10) Patent No.: US 7,769,203 B2
(45) Date of Patent: Aug. 3, 2010

(54) TARGET OBJECT DETECTION APPARATUS AND ROBOT PROVIDED WITH THE SAME

(75) Inventors: Takahiro Oohashi, Saitama (JP); Naohide Ogawa, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 1267 days.

(21) Appl. No.: 11/301,114

(22) Filed: Dec. 13, 2005

(65) Prior Publication Data

US 2006/0126918 A1    Jun. 15, 2006

(30) Foreign Application Priority Data

Dec. 14, 2004    (JP)    ............... 2004-362064
Dec. 7, 2005    (JP)    ............... 2005-352879

(51) Int. Cl.
*G06K 9/00*    (2006.01)

(52) U.S. Cl. ..................................... 382/103

(58) Field of Classification Search ................ 382/100, 382/103, 115–118, 181; 901/1; 704/200, 704/231–255, 258–269
See application file for complete search history.

(56) References Cited

U.S. PATENT DOCUMENTS

| 7,362,210 B2 * | 4/2008 | Bazakos et al. ............ 340/5.53 |
| 2003/0103647 A1 * | 6/2003 | Rui et al. .................... 382/103 |
| 2005/0171741 A1 * | 8/2005 | Doi ............................ 702/189 |

FOREIGN PATENT DOCUMENTS

| JP | 07061538 | * | 3/1995 |
| JP | 2001-157985 | | 6/2001 |
| JP | 2002-215655 | | 8/2002 |
| JP | 2003-340762 | | 12/2003 |
| JP | 2004-216513 | | 8/2004 |
| JP | 2004-160630 | | 10/2004 |
| JP | 2005-288573 | | 10/2005 |
| WO | WO 0131827 | * | 5/2001 |
| WO | 03/035334 A1 | | 5/2003 |

* cited by examiner

*Primary Examiner*—Samir A. Ahmed
*Assistant Examiner*—Atiba O Fitzpatrick
(74) *Attorney, Agent, or Firm*—Squire, Sanders Dempsey L.L.P.

(57) ABSTRACT

A target object detection apparatus for identifying a target object by using at least a camera and a wireless tag provided on the target object which exists outside of the target object detection apparatus, comprising: a target detector for reading a first identification information documented in the wireless tag; an image processor for extracting a first image information of the target object imaged by the camera; a personal identifier for identifying an imaged target object by comparing the first image information extracted by the image processor and a second image information specific to the target object; and an integration processor for determining a third identification information of the target object based on at least a second identification information identified by the personal identifier and the first identification information read by the target detector.

17 Claims, 19 Drawing Sheets

FIG.8

| | Count 990 Posture data (X, Y, Z, θx, θy, θz) Camera angle (pan, tilt, role) | | | | |
|---|---|---|---|---|---|
| 804 | Object No. | 0 | 1 | ... | 10 |
| 805 | Body position x | 85 | 25 | | 45 |
| | Body position y | 85 | 22 | | 35 |
| 806 | Speed Vx | 2 | 0 | | 0 |
| | Speed Vy | 0 | 0 | | 1 |
| 807 | Personal ID | 5 | 54 | | 12 |
| 808 | Personal certainty | 60 | 80 | | 70 |
| 809 | Personal life count | 10 | 50 | | 30 |
| 810 | RFID number | 32 | 54 | | 12 |
| 811 | RFID position | P7 | P3 | | P8 |
| 812 | RFID certainty | 40 | 80 | | 70 |
| 813 | RFID life count | 12 | 53 | | 32 |
| 814 | Voice source position θz | 0 | 0 | | 50 |
| 815 | Voice source certainty | 0 | 0 | | 70 |
| 816 | Voice source life count | 0 | 0 | | 12 |
| 817 | Object life count | 12 | 53 | | 80 |
| 818 | TOTAL ID | 5 | 54 | | 12 |
| 819 | TOTAL certainty | 50 | 90 | | 80 |

801 Count 900
802 Count 930
803 Count 960

Count 990  Posture data(X, Y, Z, θx, θy, θz)
Camera angle(pan, tilt, role)

| 1602 | RFID data | 3, 5, 10, 12 |
| --- | --- | --- |
| 1603 | RFID data life count | 0, 4, 0, 20 |

| | Object No. | | 0 | 1 | · · · | 10 |
| --- | --- | --- | --- | --- | --- | --- |
| 1604 | Face position x | | | | | |
| 1605 | Face position y | | | | | |
| 1606 | Face ID: Face certainty | Candidate 1 | 3 | 3 | | |
| | | | 60 | 80 | | |
| | | Candidate 2 | 5 | 5 | | |
| | | | 40 | 20 | | |
| | | Candidate 3 | | | | |
| 1607 | RFID number: RFID certainty | Candidate 1 | 3 | 3 | | |
| | | | 50 | 50 | | |
| | | Candidate 2 | 5 | 5 | | |
| | | | 50 | 50 | | |
| | | Candidate 3 | | | | |
| 1608 | human ID | | 5 | 3 | | |
| 1609 | human ID certainty | | 40 | 80 | | |

FIG.18A

| Object No. | | 0 | 1 | ... | 10 |
|---|---|---|---|---|---|
| Face position x | | | | | |
| Face position y | | | | | |
| Face ID: Face certainty | Candidate 1 | | | | |
| | Candidate 2 | | | | |
| | Candidate 3 | | | | |
| RFID number: RFID certainty | Candidate 1 | 3 | 3 | | |
| | | 50 | 50 | | |
| | Candidate 2 | 5 | 5 | | |
| | | 50 | 50 | | |
| | Candidate 3 | | | | |

| First group | Second group |
|---|---|
| 3, 5 | 10, 12 |

| | | Object No. | 0 | 1 | · · · | 10 |
|---|---|---|---|---|---|---|
| 1604 | | Face position x | | | | |
| 1605 | | Face position y | | | | |
| 1606 | Face ID: Face certainty | Candidate 1 | 3 | 3 | | |
| | | | 60 | 80 | | |
| | | Candidate 2 | 5 | 5 | | |
| | | | 40 | 20 | | |
| | | Candidate 3 | | | | |
| | | | | | | |
| 1607 | RFID number: RFID certainty | Candidate 1 | 3 | 3 | | |
| | | | 50 | 50 | | |
| | | Candidate 2 | 5 | 5 | | |
| | | | 50 | 50 | | |
| | | Candidate 3 | | | | |
| | | | | | | |

(1901)

TARGET OBJECT DETECTION APPARATUS AND ROBOT PROVIDED WITH THE SAME

CROSS REFERENCE TO RELATED APPLICATIONS

This application claims the foreign priority benefit under Title 35, United States Code, §119(a)-(d) of Japanese Patent Applications No. 2004-362064 and 2005-352879, filed on Dec. 14, 2004 and Dec. 7, 2005, respectively, the contents of which are hereby incorporated by reference.

BACKGROUND OF THE INVENTION

1. Field of the Invention

The present invention relates to a target object detection apparatus, and more particularly, relates to a target object detection apparatus which detects a presence of a target object based on face data of a person and data of an RFID (Radio Frequency Identification) tag attached to the person, and a robot provided with the target object detection apparatus.

2. Description of Relevant Art

In recent years, a robot which detects a target person based on a data of the RFID tag, which is attached to the target person, has been known. For example, this technology is disclosed in Japanese Laid-Open Patent Publication No. 2004-160630 (paragraphs [0101] to [0112], and FIG. 19 and FIG. 20). A robot described in the Japanese Laid-Open Patent Publication No. 2004-160630 behaves in response to a person by identifying the person coming close to a distance where information of the RFID tag can be read. In this case, for example, an ID number and "owner" or "stranger", which is a data showing a relationship with him/her, are stored in the RFID tag. Then, if a person with the RFID tag which stores the data of "owner" approaches to the robot, the robot identifies the person as the "owner", and conducts a motion, for example, to "stand up". On the other hand, if a person with the RFID tag storing the data of "stranger" approaches to the robot, the robot identifies the person as the "stranger", and conducts a motion, for example, to "draw back". That is, the information (relation) which governs the motion when the target person is detected is included in the RFID tag. Therefore, the RFID tag documenting a different relation is used for conducting a different instruction.

However, an intensity of a radio wave is too weak in some case for a communication between the robot and the person, depending on a distance (several centimeters to several meters) Therefore, transmitted data from the RFID tag may be detected incorrectly by the robot, thereby resulting in difficulty of the personal detection.

It is, therefore, an object of the present invention to provide a target object detection apparatus which can solve the aforementioned conventional issue and can accurately detect a target object, and a robot provided with the target object detection apparatus.

SUMMARY OF THE INVENTION

The present invention has been developed for achieving the above purposes. According to a first aspect of the present invention, there is provided a target object detection apparatus for identifying a target object by using at least a camera and a wireless tag provided on the target object which exists at outside of the target object detection apparatus, comprising: a target detector for reading first identification information documented in the wireless tag; an image processor for extracting first image information of the target object imaged by the camera; a personal identifier for identifying an imaged target object by comparing the first image information extracted by the image processor and second image information specific to the target object; and an integration processor for determining third identification information of the target object based on at least second identification information identified by the personal identifier and the first identification information read by the target detector.

Here, the target object is, for example, a person or a substance, and they may be moving or in a stationary state. In addition, the image information includes, for example, a characteristic parameter extracted from an image, for using a cross-check of the image. According to the above configuration, the target object detection apparatus can identify a target object which is not provided with the wireless tag by using the personal identifier, and also can identify a target object which exists at outside of a visual field of the camera by using the target detector. Therefore, the target object detection apparatus can determine the target object even if only one of the personal identifier and the target detector is available for identifying the target object. Further, when an external appearance of the target object and the identification information of the wireless tag are different, for example, one of the identification information identified by the personal identifier and the identification information read by the target detector may be predetermined to be correct.

According to a second aspect of the present invention, there is provided the target object detection apparatus, further comprising: a voice source determiner for extracting a voice source position from a voice of the target object, wherein the integration processor determines the third identification information of the target object based on the second identification information identified by the personal identifier, the first identification information read by the target detector, and the voice source position extracted by the voice source determiner.

According to the above invention, the target object detection apparatus extracts the voice source position from a voice produced by the target object by using the voice source determiner. For example, when the target object has moved from the visual field of the camera of the personal identifier to outside of the visual field, the voice source position can be used for correcting a position of the target object when the position of the target object at outside of the visual field is forecasted.

According to a third aspect of the present invention, there is provided the target object detection apparatus, further comprising: a certainty computer for computing a first certainty of the first identification information read by the target detector, wherein the personal identifier computes a second certainty of the second identification information identified by the personal identifier, and when the second identification information identified by the personal identifier and the first identification information read by the target detector for a single target object are different, the integration processor determines the third identification information of the target object based on the second certainty computed by the personal identifier and the first certainty computed by the certainty computer.

According to the above invention, the personal identifier identifies a target object with a given certainty. The certainty is, for example, a similarity which is computed based on the characteristic parameter extracted from the specific image of the target, or a certainty which is computed based on the similarity. In addition, when the certainty of the identification information read by the target detector is computed, the certainty computer computes the certainty, for example, based on an elapsed time after reading the identification information by the target detector. Then, when the identification information identified by the personal identifier and the identification information read by the target detector for a single target object are different, the integration processor selects the identification information which has a higher certainty between the certainty computed by the personal identifier and the certainty computed by the certainty computer as the identification information of the target object. Meanwhile, any one of the identification information may be predetermined to be prioritized if both the certainties of the identification information are equal.

According to a fourth aspect of the present invention, there is provided the target object detection apparatus, further comprising: a storage for storing, by time and by target objects, a position information of the target object which is identified from the first image information extracted by the image processor and the third identification information determined by the integration processor.

According to the above invention, the storage stores the position information of the target object extracted by the personal identifier and the identification information determined by the integration processor, by time and by target objects. Therefore, a plurality of the target objects can be traced and controlled by referring to the storage. For example, a position of the target object moving from hour to hour can be forecasted.

According to a fifth aspect of the present invention, there is provided the target object detection apparatus, further comprising: one or more than one database for storing image information corresponding to the second identification information identifying the target object, wherein the personal identifier comprising: a specific face image data obtainer for obtaining the image information from the one or more than one database as the second image information specific to the target object; and an imaged face image candidate identifier for comparing at least one image information obtained by the specific face image data obtainer and the first image information extracted by the image processor, and based on a comparison of both the image information, prioritizing the second identification information corresponding to the at least one image information obtained, and identifying prioritized second identification information as a candidate of the imaged target object.

According to the above invention, the personal identifier prioritizes the at least one identification information corresponding to the image information obtained by the specific face image data obtainer, based on the result of the comparison. Therefore, when image information of at least one target object is extracted by the image processor, the at least one identification information can be assigned to a candidate of the at least one target object. As a result, a plurality of target objects, whose image information is extracted, can be correctly identified.

According to a sixth aspect of the present invention, there is provided the target object detection apparatus, further comprising: a target detector for detecting first position information of the wireless tag; and a storage for storing, by time and by target objects, second position information of a target object identified by the imaged face image candidate identifier, the second identification information prioritized by the personal identifier, the first identification information read by the target detector, and the third identification information determined by the integration processor, wherein the personal identifier, further comprising: an RFID number obtainer for obtaining at least one first identification information which is read by the target detector from the storage, based on the second position information of the target object identified by the first image information extracted by the image processor, wherein the specific face image data obtainer obtains the second image information corresponding to the first identification information obtained by the RFID number obtainer as the second image information specific to the target object.

According to the above invention, the storage can store a plurality of identification information read by the target detector for a single target object. In this case, the personal identifier obtains a plurality of identification information against a single target object which is extracted by the image processor by using the RFID number obtainer. Then, the personal identifier obtains a plurality of image information corresponding to the plurality of identification information, which is obtained by the RFID number obtainer, by using the specific face image data obtainer. Accordingly, the personal identifier can efficiently obtain suitable image information to be compared with the image information extracted by the image processor.

According to a seventh aspect of the present invention, there is provided the target object detection apparatus, wherein the personal identifier further comprises: a group composer for obtaining all of the first identification information read by the target detector, and dividing the all of the first identification information into a first group (A) comprising the second identification information of the imaged target object and a second group comprising information other than the second identification information of the imaged target object, wherein the specific face image data obtainer obtains the second image information corresponding to the first identification information by each identification information which belongs to each group formed by the group composer as the second image information specific to the target object, and wherein the imaged face image candidate identifier compares the second image information obtained by the specific face image data obtainer and the first image information extracted by the image processor by groups, which are grouped by the group composer.

According to the above invention, the storage can store identification information, which is read by the target detector, for a plurality of target objects. In this case, the personal identifier divides the plurality of target objects into the first group and the second group by using the group composer. Then, the personal identifier obtains image information corresponding to identification information which belongs to each group, by using the specific face image data obtainer. Next, the personal identifier compares the image information obtained by the specific face image data obtainer and the image information extracted by the image processor, by groups, by using the imaged face image candidate identifier. Here, identification of an imaged target object may be possible in some case by using only the first group. Since the identification information obtained from the storage is the information read by the target detector, there is a possibility to include a reading error in the identification information. However, since the group composer also forms the second group, the effect of the reading error can be removed even if the reading error is included in the first group.

According to an eighth aspect of the present invention, there is provided a robot provided with the target object detection apparatus, wherein the robot is capable of autonomous traveling control according to a target object identified by the third identification information of the target object detection apparatus, as well as conducting a predetermined traveling based on an external command.

According to the above invention, the robot not only identifies a target object coming close to the robot, but also evaluates whether or not the target object is the target which is commanded to identify by approaching to the target object, for example, by walking. Then, if the target object is the commanded target, the robot can implement the commanded motion. With this invention, by changing a content of the command, the robot can implement various motions against a single target object in response to a scene and a condition.

According to a ninth aspect of the present invention, there is provided the robot provided with the target object detection apparatus, wherein a content of the external command comprises identification information and position information of a requester requesting a delivery of goods, and identification information and position information of an addressee who receives the good, and wherein the predetermined traveling comprises a search and an identification of the requester, a reception of the goods from the requester, a search and identification of the addressee, and handing of the goods received from the requester to the addressee.

According to the above invention, the robot identifies, based on the command, whether or not a person who is detected at a position where the requester is to be is the requester, and whether or not a person detected at a position where the addressee is to be is the addressee. Therefore, if the detected person is different from the requester or the addressee, the command is not implemented, and if the detected person is the right person, the command is implemented. As a result, the robot can implement the command correctly.

According to a tenth aspect of the present invention, there is provided the robot provided with the target object detection apparatus, further comprising: a voice synthesizer for producing a voice based on conversation data specific to the requester and the addressee, respectively, when one of the requester and the addressee is identified; and a voice identifier for identifying a personal voice.

According to the above invention, when a person who is detected based on the command is the requester, the robot produces a speech for the requester, for example, "Please hand the good.", and when the person is the addressee, the robot produces a speech for the addressee, for example, "Please receive the good". In addition, when the identification information identified by the personal identifier and the identification information identified by the target detector for the detected person are different, it may be possible to produce one of the speeches corresponding to the requester and addressee for confirming whether or not the detected person is the right person. In this case, since a reply of the detected person is identified with the voice identifier, the confirmation of the right person can be implemented correctly.

According to the first aspect of the present invention, the target object detection apparatus can identify the target object even when only one of the external appearance of the target object and the identification information stored in the wireless tag is identified. In addition, the target object detection apparatus can improve an identification accuracy, by using both of the identification by the image processing and the identification by the wireless tag.

According to the second aspect of the present invention, when a target object produces a voice, the target object detection apparatus can use a voice source position for correcting a position of the target object which exists at outside of the visual field of the camera by extracting the voice source position, for example, when the target object has moved from the visual field to outside of the visual field.

According to the third aspect of the present invention, the personal identifier identifies a target object with a given certainty, and the certainty computer computes the certainty of the identification information read by the target detector. Accordingly, the integration processor can quantitatively determine the target object.

According to the fourth aspect of the present invention, the storage stores the position information of the target object extracted by the personal identifier and the identification information determined by the integration processor, by time and by target objects. Accordingly, a plurality of the target objects can be traced and controlled.

According to the fifth aspect of the present invention, since a plurality of identification information, which is prioritized, for a single target object is considered, when image information of a plurality of target objects is extracted by the image processor, the each target object can be correctly identified.

According to the sixth aspect of the present invention, when a plurality of identification information read by the target detector for a single target object is stored, the image information corresponding to the identification information is also obtained. Therefore, suitable image information to be compared with the image information extracted by the image processor can be efficiently obtained.

According to the seventh aspect of the present invention, since all read identification information is grouped and image information corresponding to the identification information is cross-checked by each group, an effect of the reading error can be removed even if the reading error is included in the information obtained from the storage.

According to the eighth aspect of the present invention, the robot can implement various motions according to a scene and a condition by changing a content of the command.

According to the ninth aspect of the present invention, since the robot identifies whether or not a detected person is a requester or an addressee based on the command, the delivery motion can be implemented correctly.

According to the tenth aspect of the present invention, since the robot produces a speech for a requester when the detected person is the requester and also produces a speech for an addressee when the detected person is the addressee, based on the command, the robot can deliver goods through communication with the detected person.

BRIEF DESCRIPTION OF THE DRAWINGS

FIG. 8 is an illustration for explaining an object map;

FIG. 16 is an illustration for explaining an object map according to the second embodiment;

FIG. 18A is an illustration for explaining obtained data in the operation of the personal identifier;

FIG. 18B is an illustration for explaining an example of groups in the operation of the personal identifier; and FIG. 19 is an illustration showing an example of a face certainty to be computed by a personal identifier.

DETAILED DESCRIPTION OF THE PREFERRED EMBODIMENT

First Embodiment

<Construction of the Target Object Detection System>

First, a total configuration of a target object detection system A provided with a target object detection apparatus according to a first embodiment of the present invention will be explained by referring to FIG. 1.

Figure 1:
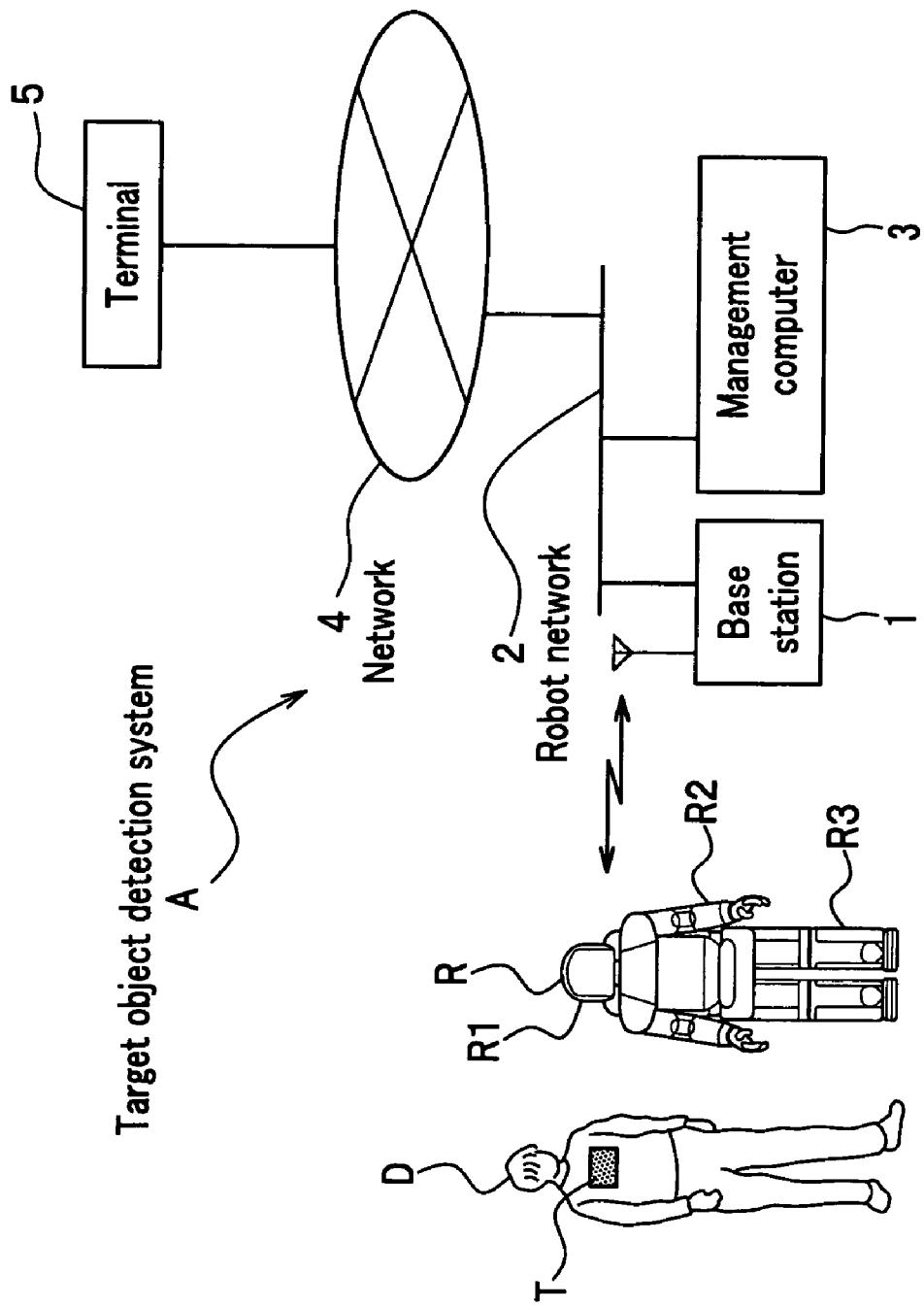
FIG. 1 is a system configuration of a target object detection apparatus according to a first embodiment of the present invention.

FIG. 1 is a system configuration of a target object detection apparatus according to the first embodiment of the present invention. The target object detection system A detects a target object D in the surrounding area of a robot R (target object detection apparatus), for example, a person with an RFID tag T (wireless tag), based on image information taken by a camera (refer to FIG. 2) of the robot R and an ID number (ID information), which is stored in the RFID tag T, identifying the person.

As shown in FIG. 1, the target object detection system A includes the robot R, a base station 1 connected to the robot R by wireless communication, a management computer 3 connected to the base station 1 through a robot network 2, a terminal 5 connected to the management computer 3 through a network 4, and the tag T attached to the target object D.

In the target object detection system A, the robot R detects a presence of the target object D, for example, a person with the tag T, and identifies the person, that is, identifies who he/she is. Meanwhile, it is assumed that a plurality of robots exist (although only one robot in FIG. 1).

The management computer 3 performs controls of the base station 1 and control of a motion, e.g. a travel, and a speech of the robot R through the robot network 2. In addition, the management computer 3 exchanges essential information with the robot R.

In the embodiment, for example, characteristic parameters such as a name of a person and face image data of the target object D, a map (local map data) in the surrounding area of the robot R, and conversation data correspond to essential information, and are stored in recording means (not shown) provided in the management computer 3.

The robot network 2 connects the base station 1, the management computer 3, and the network 4 one another, and the network 2 can be built, for example, by LAN.

The terminal 5 connects with the management computer 3 through the network 4 and is used for inputting and updating information of, for example, the RFID tag T and the person (target object D) with the RFID tag T, which are stored in memory means (not shown) of the management computer 3.

Here, an IC tag corresponds to the RFID tag T, and the RFID tag T of the embodiment will be described in detail later.

Next, the construction of the robot R will be explained in detail.

[Robot R]

Figure 2:
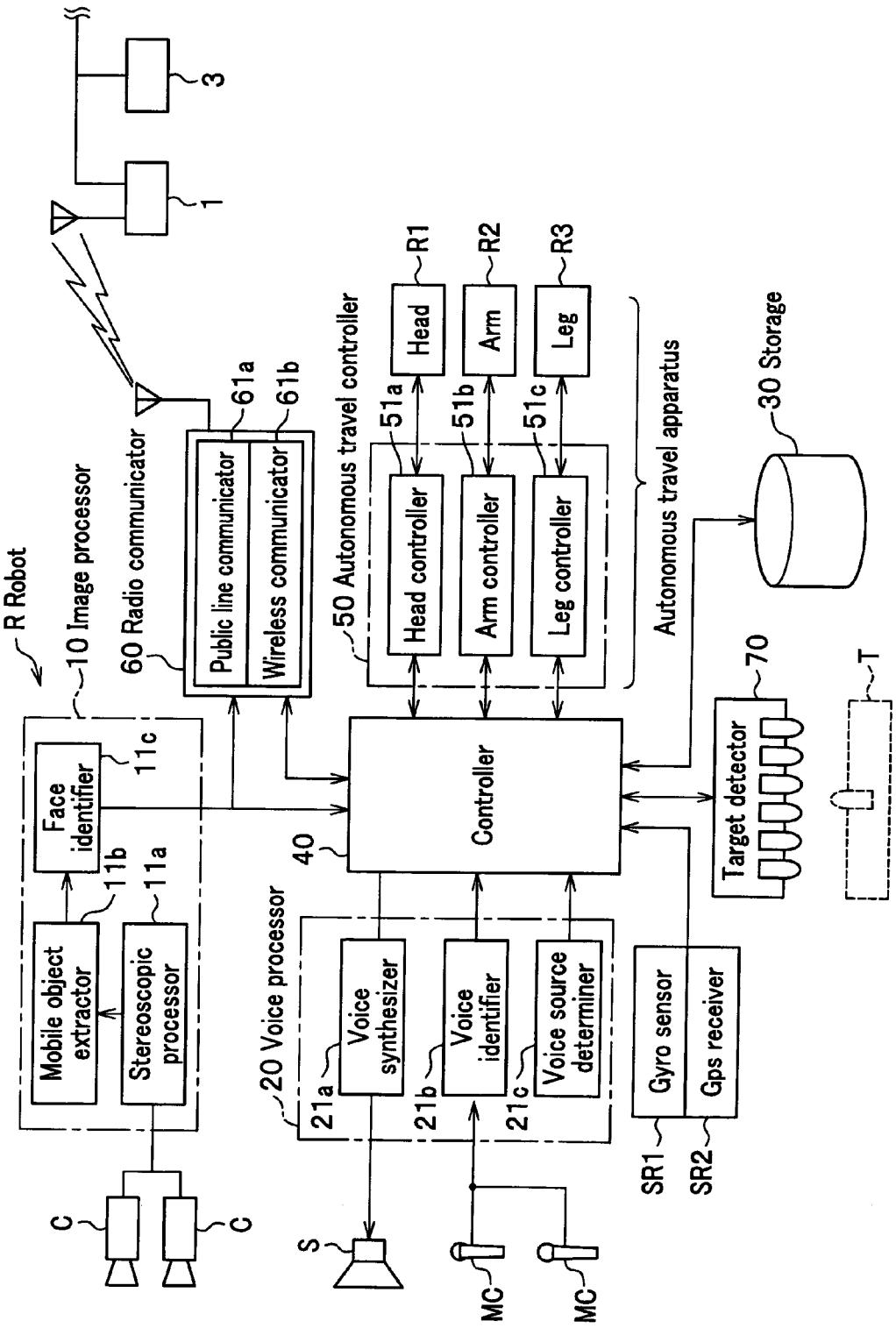
FIG. 2 is a block diagram of a robot.

The robot R is, as shown in FIG. 1, an autonomous mobile biped walking robot having a head R1, arms R1 and legs R3, which are actuated by actuators respectively, and the biped walking is controlled by an autonomous travel controller 50 (refer to FIG. 2). The detail of the biped walking is disclosed, for example, in Japanese Laid-Open Patent Publication No. 2001-62760. Meanwhile, a palm of the arm R2 of the robot R is equipped with a pressure sensor (not shown). If the robot R senses a given pressure on the palm when the hand is being opened, the robot bends the fingers at a given angle and maintains a soft holding status. Also, if the robot senses a given pull force during the soft holding status, the robot restores an original angle of the fingers by opening the palm.

FIG. 2 is a block diagram of the robot R. As shown in FIG. 2, the robot R includes cameras C, C, a speaker S, microphones MC, MC, an image processor 10, a voice processor 20, a storage 30, a controller 40, an autonomous travel controller 50, a radio communicator 60, and a target detector 70 (reading means, detecting means), as well as the head R1, the arm R2, and the leg R3. The robot R further includes a gyro sensor SR1 and a GPS (Global Positioning System) receiver SR2 for measuring a position of the robot R. Meanwhile, in the embodiment, a target object detection apparatus according to the first embodiment of the present invention is constructed with components other than the autonomous travel controller 50 of the robot R.

[Camera]

The cameras C, C acquire images in a form of a digital format. In this embodiment, for example, a color CCD (Charge-Coupled Device) camera is adopted as the camera C. The cameras C, C are arranged in a line along a lateral direction. Images acquired by the cameras C, C are supplied to the image processor 10. In this embodiment, the cameras C, C, the speaker S, and the microphone MC are installed within the head R1 of the robot R.

[Image Processor]

The image processor 10 (image processing means) recognizes a person and an obstacle in the surrounding area of the robot, in order to obtain the status of the surrounding area of the robot R from the image acquired by the cameras C, C through processing of the image. This image processor 10 includes a stereoscopic processor 11a, a mobile object extractor 11b, and a face identifier 11c.

The stereoscopic processor 11a performs a pattern matching between the two images obtained by each camera C on the basis of one of two images acquired by the cameras C, C. Then, the stereoscopic processor 11a computes a parallax of each pixel corresponding to each other in left-side image and right-side image to generate a parallax image, and outputs the parallax image to the mobile object extractor 11b together with the images entered from the cameras C, C. Here, the parallax is a distance from the robot R to the imaged target object.

The mobile object extractor 11b extracts a mobile (moving) object in the image obtained by the camera C, based on data entered from the stereoscopic processor 11a. The reason why the extraction of the mobile object is performed is to recognize a person on the assumption that the moving object is more likely to be the person.

The mobile object extractor 11b performs the pattern matching in order to extract the mobile object, and computes a distance between corresponding pixels in two images to generate a distance image. Here, the pattern matching is performed by comparing the latest frame (image) with the last frame (image), which is picked up from several frames obtained prior to the acquisition of the latest frame. Then, the mobile object extractor 11b searches a pixel whose shift amount is large among pixels within a predetermined distance from the cameras C, C (robot R), using the parallax image and the distance image. If such the pixel exists, the mobile object extractor 11b considers that a person is within the pixels, and extracts the mobile object as the parallax image within the predetermined distance, and outputs the image of the mobile object to the face identifier 11c.

The face identifier 11c extracts a human body color region from the extracted mobile object, and computes a position of a face on the camera screen in consideration of a size and shape of the extracted human body color region, and outputs a specific parameter which is acquired from the face image data to the controller 40. Meanwhile, a position coordinate (body position) of the person is also recognized on a coordinate plane that the robot R recognizes. The positions of the recognized face and body on a camera screen are supplied to the controller 40 for communicating with the person and for traveling the robot R. In addition, information of the positions is supplied to the radio communicator 60 in order to supply the information to the management computer 3 through the base station 1.

The face identifier 11c creates, for example, a standard image by enlarging an expected face region based on distance data from a photographed object. Based on the standard image, candidates of the right and left pupils are detected from pixels which form a circular edge. A normalized image, which is created from the detected pupil candidate image through normalization, is expressed with a vector (reference vector) Then, based on the reference vector, a preferable face region (face image data) is determined by computing the correct right and left pupils by making use of, so-called, a unique face method.

[Voice Processor]

The voice processor 20 includes a voice synthesizer (voice synthesizing means) 21a, a voice identifier (voice identifying means) 21b, and a voice source determiner (voice source extracting means) 21c.

The voice synthesizer 21a generates voice data from text information based on a command, which is determined by the controller 40, and instructs a speech, and outputs the voice data to the speaker S. Here, a generation of the voice data is, for example, performed by utilizing a correspondence between the voice data and text information which is recorded in advance.

The voice identifier (voice identifying means) 21b inputs voice data from the microphone MC and generates text information from the voice data, based on the correspondence between the voice data and the text information recorded in advance. Then, the voice identifier 21b outputs text data to the controller 40.

The voice source determiner (voice source extracting means) 21c determines a voice source position (a position on a plane where the robot R recognizes.) based on a difference of an acoustic pressure and a difference of an arrival time between the microphones MC, MC and outputs the position to the controller 40. The voice source position is expressed with, for example, a rotation, angle $\theta_z$ around a direction (Z axis direction) where the robot R stands.

[Storage]

A storage 30 stores necessary information (a name of the target D and a character volume of the specific face image data photographed in advance, local map data, conversation data, etc.) transmitted from the management computer 3 and an ID number (identification information) and position information of the target D which are recognized by robot R. Meanwhile, the storage 30 corresponds to target object information storage means.

[Controller]

The controller 40 controls an image processor 10, a voice processor 20, a storage 30, an autonomous travel controller 50, a radio communicator 60, and a target detector 70. The controller 40 implements control for identifying the target object D. The detail will be described later.

[Autonomous Travel Controller]

The autonomous travel controller 50 includes a head controller 51a, an arm controller 51b, and a leg controller 51c.

The head controller 51a actuates the head R1 based on a command entered from the controller 40. The arm controller 51b actuates the arms R2 based on a command entered from the controller 40. The leg controller 51c actuates the legs R3 based on a command entered from the controller 40.

In addition, data obtained by the gyro sensor SR1 and the GPS receiver SR2 is supplied to the controller 40, and is used for determining a motion of the robot R. Also, the same data is supplied to the management computer 3 through the radio communicator 60.

[Radio Communicator]

The radio communicator 60 exchanges data with the management computer 3. The radio communicator 60 includes a public line communicator 61a and a wireless communicator 61b.

The public line communicator 61a performs a wireless communication by using a cellular phone line or a PHS (Personal Handyphone System) system. On the other hand, the wireless communicator 61b performs a wireless communication by using a short-range wireless communication technique, e.g. a wireless LAN (Local Area Network) complying with the IEEE802.11b standard.

The radio communicator 60 performs a data exchange with the management computer 3 by using one of the public line communicator 61a and the wireless communicator 61b, when a signal which commands the robot R to communicate with the management computer 3 is entered from the management computer 3.

[Target Detector]

The target detector 70 (reading means, detecting means) detects a presence of the target object D with the RFID tag T within a surrounding area of the robot R, and computes a position (position of the tag) such as a direction and a distance of the target object D (RFID tag T) on the basis of the position of the robot R when the presence of the target object D (RFID tag T) is detected in the surrounding area. The target detector 70 also reads the ID number (identification information) stored in the RFID tag T, as well as computes a position (RFID position) based on the tag position and posture data of the robot R, which will be described later.

Figure 3:
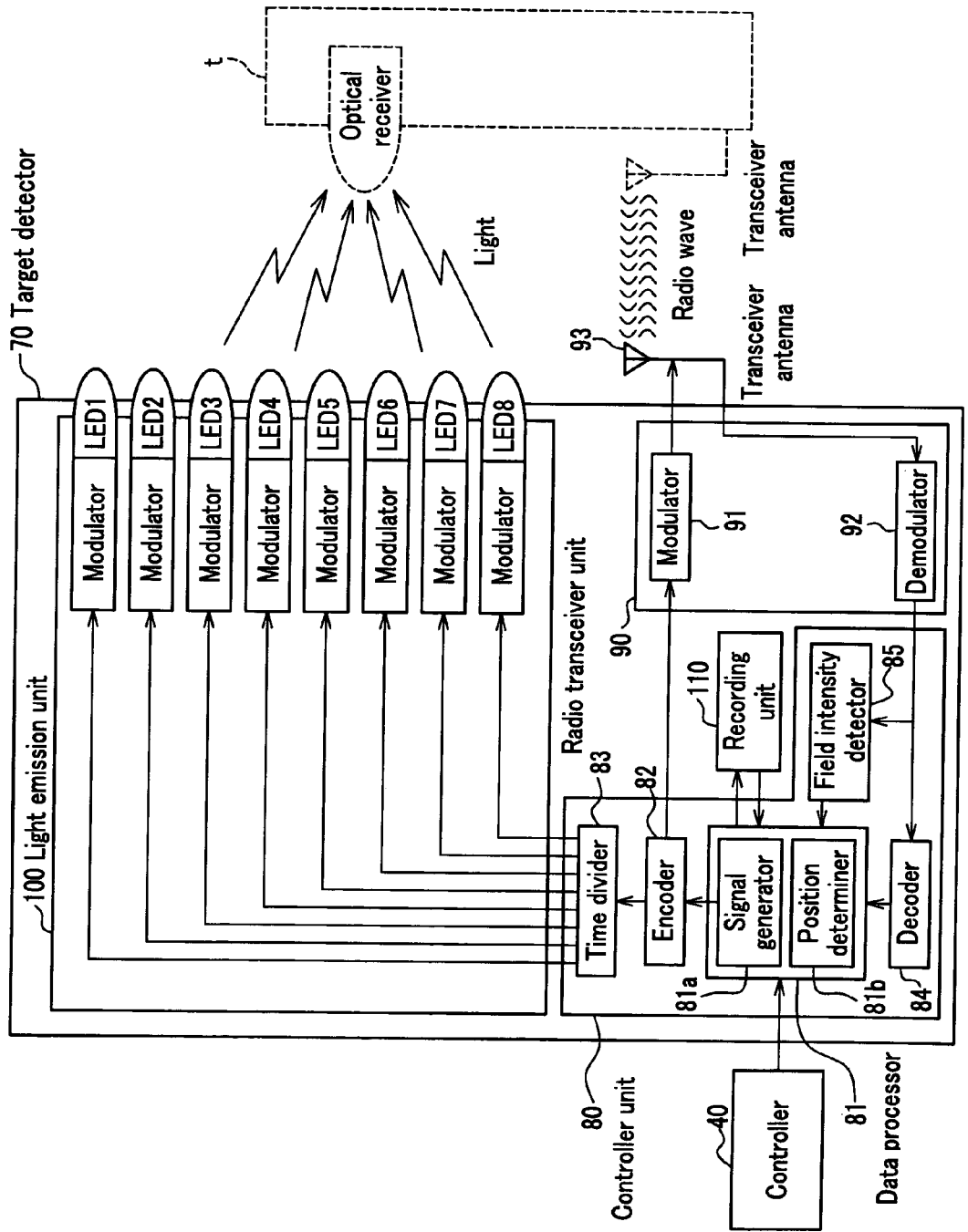
FIG. 3 is a block diagram of a target detection unit of a robot.

Specifically, the target detector 70 irradiates a light against a searching region around the robot R on the basis of the robot R, as well as transmits radio waves to the surrounding area of the robot R for computing the position of the tag. When a signal (reception report signal) which notifies that the target object D (RFID tag T) has received the radio waves and the light from the robot R is sent back to the target detector 70 from the target object D, the target detector 70 computes a distance from the robot R to the target object D (RFID tag T) by using an intensity of electric field of the reception report signal. In addition, the target detector 70 computes the position of the tag on the assumption that a direction identified from information included in advance in the reception report signal is the direction where the target object D exists. For this purpose, as shown in FIG. 3, the target detector 70 includes a controller unit 80, a radio transceiver unit 90, a light emission unit 100, and a recording unit 110. FIG. 3 is a block diagram showing a configuration of the target detector 70 in detail.

(Controller Unit)

The controller unit 80 generates a search signal to be transmitted wirelessly from the radio transceiver unit 90 which will be described later, and a direction check signal which is emitted as an infrared light from the light emission unit 100. The controller unit 80 also determines the position of the tag based on the reception report signal transmitted from the RFID tag T which has received the search signal. Here, the search signal is a signal to be used for checking whether or not the target object D exists in the surrounding area of the robot R, and the direction check signal is a signal to be used for checking in which direction with respect to the robot R the target object D exists. The reception report signal is a signal which indicates that the tag T has received at least the search signal.

The controller unit 80 includes a data processor 81, an encoder 82, a time divider 83, a decoder 84, and a field intensity detector 85.

The data processor 81 generates the search signal and the direction check signal, and determines the position of the tag. The data processor 81 includes a signal generator 81*a* and a position determiner 81*b*.

(Signal Generator 81*a*)

The signal generator 81*a* of the data processor 81 obtains an ID number (hereinafter, referred to as robot ID) specific to the robot R provided with the target detector 70 by referring to the recording unit 110 at a predetermined cycle or when a signal (a transmission request signal), which requests a transmission of the radio wave, is entered from the controller 40.

Then the signal generator 81*a* generates a search signal which includes the robot ID and a reception report request signal.

Here, the reception report request signal is a signal which requests the target object D (RFID tag T) to generate the reception report signal when the target object D has received the search signal.

The signal generator 81*a* also generates a direction check signal which is emitted as an infrared light signal from a light emission unit 100, which will be described later, when the search signal is generated.

The direction check signal is generated for each light emitter (LED 1 to LED 8) of the light emission unit 100, separately, and includes the robot ID and an emitter ID which is a unique identification number for identifying the light emitter.

Meanwhile, the direction check signal is also generated, when the reception report signal entered from the decoder 84, which will be described later, includes an emission request signal.

In the present embodiment, since eight light emitters in total are provided on the robot R, the data processor 81 generates eight direction check signals in total which include the robot ID and the emitter ID.

For example, if it is assumed that the robot ID is "02" (robot ID=02) and that the emitter IDs of the light emitters (from LED 1 to LED 8) are from "L1" to "L8", a direction check signal to be generated for the light emitter LED 1 includes the robot ID whose ID is "02" and the emitter ID whose ID is "L1". Also, a direction check signal to be generated for the light emitter LED 2 includes the robot ID whose ID is "02" and the emitter ID whose ID is "L2".

Then, the signal generator 81*a* outputs the direction check signal and the search signal to the encoder 82.

Here, the position determiner 81*b* of the data processor 81 determines the tag position based on the reception report signal transmitted from the RFID tag T which has received the search signal. The detailed explanation of the signal processing in the position determiner 81*b* will be made later together with the signal processing of the field intensity detector 85 and the decoder 84 included in the controller unit 80.

(Encoder 82)

The encoder 82 encodes a signal entered to the encoder 82, and outputs the encoded signal.

Then, the encoder 82 outputs a search signal (encoded search signal), which is obtained by encoding the search signal, to the radio transceiver unit 90, and thereby, the encoded search signal is modulated and transmitted from the radio transceiver unit 90.

The encoder 82 also encodes the direction check signal entered from the data processor 81 to obtain the encoded direction check signal, and outputs the encoded direction check signal to the time divider 83. In the embodiment, the direction check signal is generated for each light emitter of the light emission unit 100.

Therefore, as shown in FIG. 3, since the light emission unit 100 has the eight light emitters in total, eight direction check signals in total are generated in the encoder 82 and are outputted to the time divider 83.

(Time Divider 83)

The time divider 83 determines an order of the emission of the light emitters (LED 1-LED 8) of the light emission unit 100, and a timing of the emission of each light emitter (LED 1-LED 8).

To be more specific, the time divider 83 determines the order and the timing of the emission of each light emitter (LED 1-LED 8) when the encoded direction check signal is entered from the encoder 82. Then, the time divider 83 outputs the encoded direction check signal to the light emission unit 100 based on the determined order and timing.

For example, if it is assumed that each light emitter emits a light at 0.5 sec interval in order of the light emitter LED 1, the light emitter LED 4, the light emitter LED 7, the light emitter LED 2, the light emitter LED 5, the light emitter LED 8, the light emitter LED 3, and the light emitter LED 6, the time divider 83 outputs the encoded direction check signal at 0.5 sec interval to a modulator of each light emitter (LED 1-LED 8). That is, the time divider 83 outputs the encoded direction check signal at 0.5 sec interval in order of: the modulator of the light emitter LED 1; the modulator of the light emitter LED 4; the modulator of the light emitter LED 7; the modulator of the light emitter LED 2; the modulator of the light emitter LED 5; the modulator of the light emitter LED 8; the modulator of the light emitter LED 3; the modulator of the light emitter LED 6.

In this embodiment, the eight encoded direction check signals in total are entered in the time divider 83. A light emitter to which an encoded direction check signal is supplied is determined in advance by the data processor 81.

The time divider 83, therefore, checks the emitter ID included in the encoded direction check signal when the encoded direction check signal is entered, and outputs the encoded direction check signal to the modulator of the light emitter, which is specified by the emitter ID, with a determined order and timing.

For example, if the emitter IDs of the light emitters (LED 1-LED 8) are specified by L1 to L8, the time divider 83 outputs the encoded direction check signal, which includes emitter ID="L1", to the adjacent modulator of the light emitter whose emitter ID is "L1". Also, the time divider 83 outputs the encoded direction check signal, which includes the emitter ID="L2", to the modulator of the light emitter whose emitter ID is "L2".

(Light Emission Unit 100)

The light emission unit 100 emits a light to search regions, which are set in advance around the robot R on the basis of the position of the robot R.

As shown in FIG. 3, the light emission unit 100 includes the plurality of the light emitters (LED 1-LED 8) and the modulator provided to each light emitter.

The modulator modulates the encoded direction check signal entered from the time divider 83 to obtain a modulated signal.

The light emitter emits the modulated signal as an infrared light signal (infrared light) to a predetermined search region.

Figure 4:
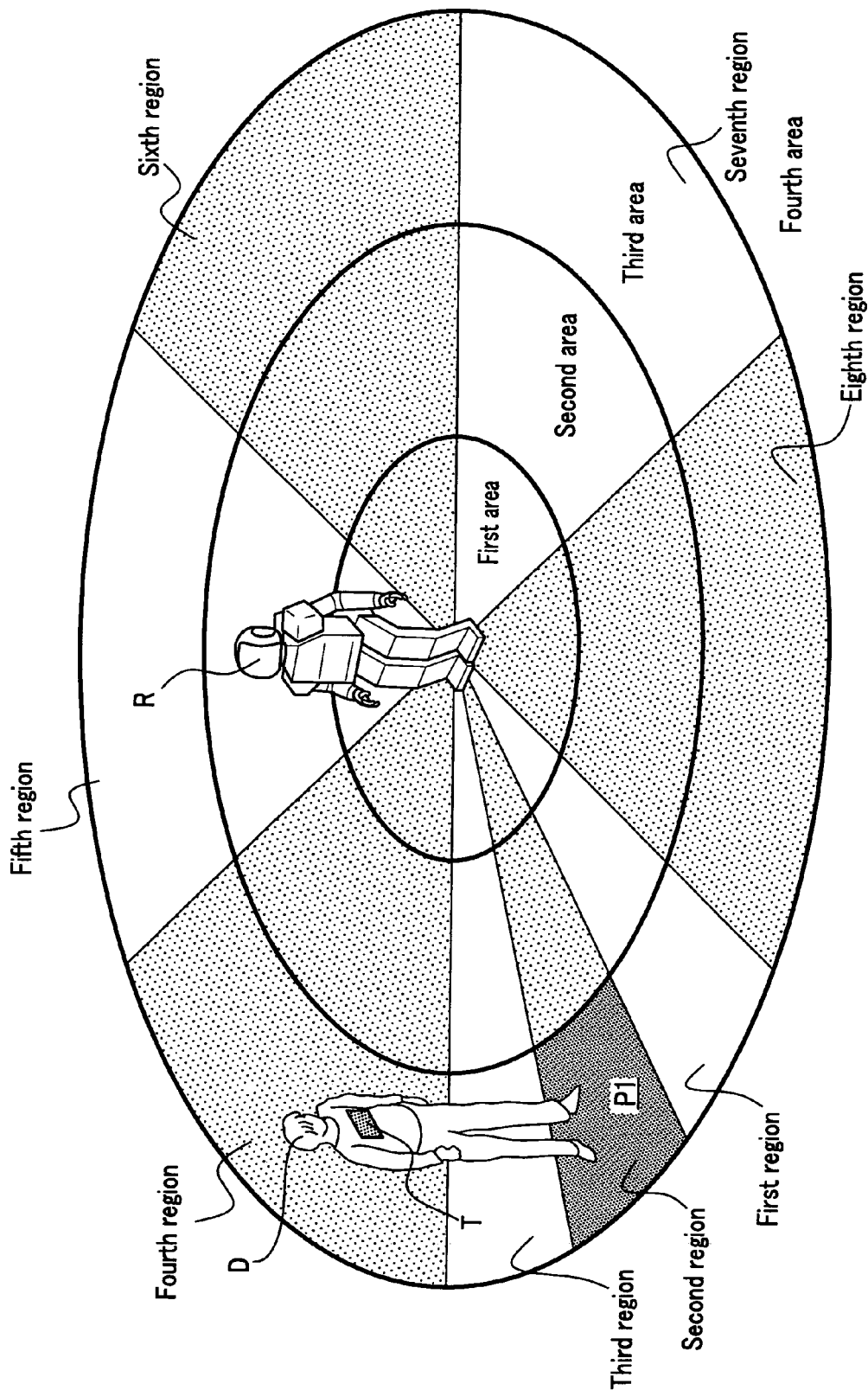
FIG. 4 is an illustration for explaining a method for identifying a position of a target object.

In this embodiment, the surrounding area of the robot R is divided into a plurality of search regions in order to determine the position (tag position) of the target object D as shown in FIG. 4. FIG. 4 is an illustration for explaining a method for determining a position of the target object D. The robot R is provided with light emitting diodes, each of the diodes is served as a light emitter for emitting infrared light to the search region and the each is directed to a specific search region. Here, one light emitting diode is directed to one search region.

To be more specific, in the case of FIG. 4, eight search regions in total (from a first region to an eighth region) are established around the robot R. That is, the robot R is provided with the eight search regions in 360-degree directions of the robot R.

In other words, fan-shaped search regions (from the first region to the eighth region) are established around the robot R so that the robot R is surrounded by the fan-shaped search regions. The robot R is positioned at around the center of the area formed by these fan-shaped search regions (from the first region to the eighth region).

Therefore, in the case of FIG. 4, the eight light emitters (not shown) in total are provided around the head R1 of the robot R so that the infrared light is surely emitted toward each search region.

As can be seen from FIG. 4, the search regions (the 1st region to the 3rd region) which are provided in front of the robot R are narrower than the remainders of search regions (the 4th region to the 8th region). This is because of the following reason. That is, when the robot R detects a presence of the target object D, if a direction of the face of the robot R (called as a direction of a sight line) does not agree with the direction of the target object D when the robot R turns the face to the target object D, the target object D (person) may feel that the robot R is not directing his face toward the target object D.

For avoiding such a situation, it is preferable to increase the number of search regions, but not necessary to increase the number of the search regions along 360-degree directions. The situation can be prevented by increasing only the number of the search regions which are positioned in front of the robot R. As a result, the direction of sight line of the robot R can be aligned to the direction of the position where the target object D exists. The number of the light emitter also can be decreased by using this method.

Therefore, in this embodiment, the tag position within each search region (from first region to the third region) is accurately determined by narrowing the irradiation range of the infrared light for each search region (from first region to the third region) located in front of the robot R.

Through the above, when the target object D is a person and a face of the person is imaged with cameras C, C of the robot R, by precisely measuring the position of the target object D in front of the robot R, the measurement result can be used for adjusting the traveling control of the robot R and the image angle of the cameras C, C. As a result, the cameras C, C of the robot R can be accurately directed to the face of the person of the target object D.

Further, in this embodiment, in order to minimize the region excluded from the search region, i.e. to minimize a dead space in the surrounding area, the range of the search region is arranged so that adjacent search region overlaps to each other at the edge. Then, when the infrared light is irradiated simultaneously or continuously on the adjacent search region, interference may be caused in some case at the overlapped region. However, in FIG. 4, an area of the overlapped search region is neglected for simplification.

Therefore, in this embodiment, the output order and timing of the encoded direction check signal from the time divider 83 of the controller unit 80 are controlled for preventing the occurrence of the interference of the infrared light by continuous irradiation of the infrared light on the adjacent search regions. Meanwhile, an irradiation range in height of the infrared light is set so that the presence of a person, e.g. a person from a child to an adult, can be detected at an average distance (interpersonal distance) where a person talks with face to face.

Referring to FIG. 3 again, an explanation on the configuration of the target detector 70 will be continued.

(Radio Transceiver Unit)

The radio transceiver unit 90 transmits radio waves toward a surrounding area of the robot R, and receives a reception report signal transmitted from the RFID tag T which has received the radio waves. The radio transceiver unit 90 includes a modulator 91, a demodulator 92, and a transceiver antenna 93.

The modulator 91 modulates a search signal (practically, encoded search signal) which is entered from the data processor 81 through a given encoding to generate a modulated signal, and transmits the modulated signal through the transceiver antenna 93.

The demodulator 92 receives the modulated signal transmitted wirelessly from the RFID tag T trough the transceiver antenna 93, and obtains the reception report signal (practically, encoded reception report signal) by demodulating the modulated signal. Then, the modulator 92 outputs the encoded reception report signal to the decoder 84 and the field intensity detector 85 of the controller unit 80.

(Decoder 84)

The decoder 84 obtains the reception report signal by decoding the encoded reception report signal, which has been generated by encoding the reception report signal, and outputs the reception report signal to the data processor 81. In this embodiment, since the reception report signal includes at least the emitter ID, the robot ID, and an ID number (RFID number), the decoder 84 outputs these IDs to the data processor 81. Meanwhile, if the reception report signal includes an emission request signal, the decoder 84 also outputs the emission request signal to the data processor 81.

(Field Intensity Detector)

The field intensity detector 85 measures an intensity of a modulated signal, when the modulated signal transmitted from the RFID tag T is received by the radio transceiver unit 90.

To be more precise, the field intensity detector 85 detects a power of the encoded reception report signal, which is entered from the demodulator 92 of the radio transceiver unit 90, and computes an average of the detected power. Then, the field intensity detector 85 outputs the computed average value as the data of the field intensity to the data processor 81.

(Position Determiner)

The position determiner 81*b* of the data processor 81 determines the tag position, and generates an RFID position based on the determined tag position and the posture data of the robot R.

To be more specific, the position determiner 81*b* computes a distance to the target object D (RFID tag T) from the robot R based on the field intensity of the modulated signal, which is transmitted from the RFID tag T and received in the radio transceiver unit 90. The position determiner 81*b*, additionally, refers to the emitter ID included in the reception report signal, and identifies the light emitter which has emitted the light received by the target object D (RFID tag T). Then, the position determiner 81*b* regards a direction of the search region to which the light emitter, which is identified by the emitter ID, has emitted the light as the direction of the target object D (RFID tag T). Accordingly, the tag position can be identified.

In this embodiment, first, the position determiner 81*b* obtains the robot ID from the reception report signal entered from the decoder 84. Then, the position determiner 81*b* compares the obtained robot ID with the robot ID stored in the recording unit 110. If the two robot IDs are same, the position determiner 81*b* starts measuring the tag position and reading the RFID number.

In this embodiment, as shown in FIG. 4, the surrounding area of the robot R is divided into four areas depending on a distance from the robot R. That is, a first area, a second area, a third area, and a fourth area are established in order of a short distance from the robot R. Each area is correlated with the field intensity in advance on the basis of a value of field intensity, and a table (a distance table) which indicates the correlation between the area and the field intensity is stored in the recording unit 110. Therefore, the position determiner 81*b* refers to the distance table based on the field intensity entered from the field intensity detector 85, and obtains information (area information) which indicates an area where the RFID tag T, which transmitted the reception report signal, exists among the four areas. Here, for example, if a field intensity a entered from the field intensity detector 85 is between threshold values $\beta$ and $\gamma$ (here, $\beta$ is a lower limit of the third area and $\gamma$ is an upper limit of the third area), the position determiner 81*b* obtains the area information indicating the third area.

In addition, the position determiner 81*b* refers to the emitter ID included in the reception report signal entered from the decoder 84, and identifies the light emitter, which has emitted the light received by the RFID tag T that transmitted the reception report signal, of light emission unit 100 of the robot R. Then, the position determiner 81*b* obtains information (direction information) which indicates the irradiation direction of the light from the identified light emitter. In this embodiment, as shown in FIG. 4, the eight search regions in total (from first region to eighth region) are established in the surrounding area of the robot R, and the recording unit 110 stores a table (direction table) which indicates the search regions where each light emitter is directed. Therefore, the data processor 81 refers to the direction table stored in the recording unit 110 based on the emitter ID, and confirms the search region where the infrared light from the light emitter identified by the emitter ID is irradiated, among the predetermined search regions (from 1st region to 8th region) Then, the data processor 81 obtains information indicating the identified search region as the information (direction information) which indicates the direction of the target object D (RFID tag T).

The position determiner 81*b* identifies the tag position based on the obtained area information and direction information. Here, the tag position is explained by referring to FIG. 4. If the content of area information is "3RD AREA" and the content of direction information is "2ND REGION", the data processor 81 regards the overlapping area (the area indicated with a symbol P1 in FIG. 4) between "3RD AREA" and "2ND REGION" around the robot R as the position of the RFID tag T.

As described above, a positional relation between the robot R and the target object D (RFID tag T) is determined based on the intensity of the reception report signal received by the robot R and the emitter ID included in the reception report signal. In other words, the direction and distance of the target object D (RFID tag T) are computed on the basis of the position of the robot R, that is, the position of the tag can be determined.

Then, the position determiner 81*b* generates the RFID position based on the determined tag position and the posture data of the robot R, and outputs the RFID position to the controller 40 of the robot R together with the RFID ID number included in the reception report signal entered from the decoder 84. Therefore, the controller 40 of the robot R can move the robot R to the front of the target object D, and adjust an angle and direction of the camera C when the target object D is a human, by controlling the autonomous travel controller 50, thereby the imaging of a face image of the target object D becomes possible.

Meanwhile, the position determiner 81*b* has a storage means (not shown) for storing the posture data of the robot R obtained from the controller 40. With this means, when a posture of the robot R is changed due to a time lag until determining the tag position, the accurate RFID position can be obtained by searching past posture data based on time information included in the determined tag position and relating the past posture data to a current tag position.

When the emission request signal is included in the reception report signal, the signal generator 81*a* generates a direction check signal and outputs it to the encoder 82. Then, the infrared light is emitted from each light emitter of the light emission unit 100.

[RFID Tag]

Figure 5:
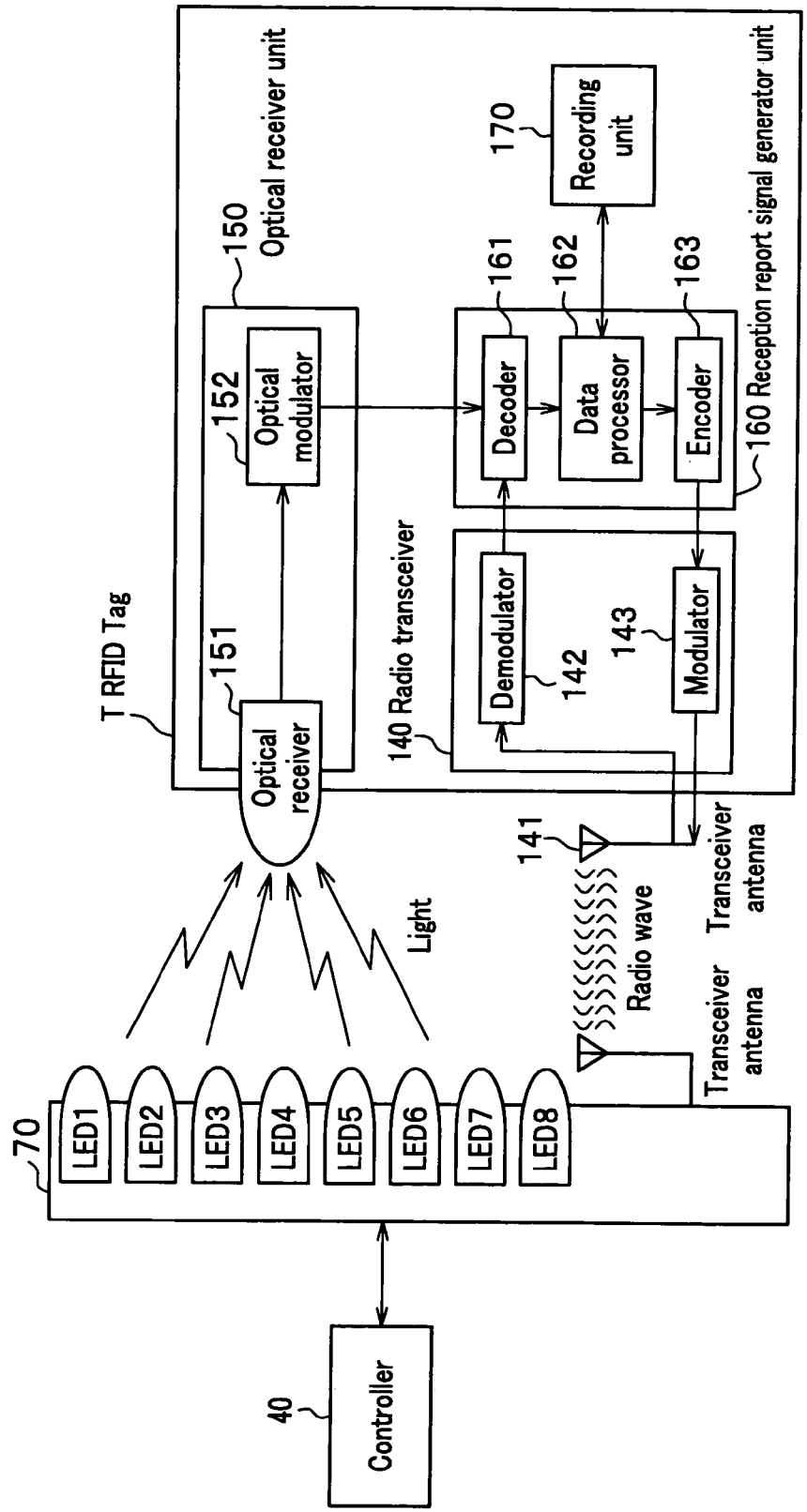
FIG. 5 is a block diagram showing a configuration of an RFID tag.

Here, the RFID tag T to be detected by the target detector 70 will be explained by referring to FIG. 5. FIG. 5 is a block diagram showing a configuration of the RFID tag T.

The RFID tag T receives radio waves and a light signal which are transmitted from the robot R, and returns the reception report signal which indicates the receptions of the radio waves and the light signal to the robot R. In this embodiment, because a person with the RFID tag T corresponds to the target object D, the radio waves and the light signal from the robot R are received by the RFID tag T.

As shown in FIG. 5, the RFID tag T includes a radio transceiver unit 140, an optical receiver unit 150, a reception report signal generator unit 160, and a recording unit 170.

(Radio Transceiver Unit 140)

The radio transceiver unit 140 receives a modulated signal transmitted wirelessly from the robot R, and also wirelessly transmits a modulated signal, which is obtained by modulating the reception report signal entered from the reception report signal generator unit 160, to the robot R. The radio transceiver unit 140 includes an transceiver antenna 141, a demodulator 142, and a modulator 143.

The demodulator 142 demodulates a modulated signal, which is transmitted from the robot R and received through the transceiver antenna 141, to obtain the search signal (practically, an encoded search signal). Then, the demodulator 142 outputs the encoded search signal to the reception report signal generator unit 160, which will be described later.

The modulator 143 modulates a reception report signal (encoded reception report signal), which is entered from an encoder 163 of the reception report signal generator unit 160, to obtain a modulated signal. Then, the modulator 143 transmits the modulated signal wirelessly to the robot R through the transceiver antenna 141.

(Optical Receiver Unit)

The optical receiver unit 150 receives an infrared light irradiated from the robot R. The optical receiver unit 150 includes an optical receiver 151 and an optical demodulator 152.

The optical receiver 151 directly receives an infrared light (an infrared light signal) radiated from the robot R.

The optical demodulator 152 demodulates the infrared light signal received by the optical receiver 151 to obtain a direction check signal (practically, an encoded direction check signal).

To be more specific, when an infrared light signal radiated from the robot R is received by the optical receiver 151, the optical receiver unit 150 demodulates the infrared light signal to obtain the encoded direction check signal. Then, the optical receiver unit 150 outputs the encoded direction check signal to the reception report signal generator unit 160.

(Reception Report Signal Generator Unit)

When the radio transceiver unit 140 receives a search signal transmitted from the robot R, the reception report signal generator unit 160 generates a signal (reception report signal), which indicates the reception of the search signal from the robot R, in response to the reception report request signal included in the search signal. As shown in FIG. 5, the reception report signal generator unit 160 includes a decoder 161, a data processor 162, and an encoder 163.

The decoder 161 decodes the encoded signal to obtain the signal. That is, the decoder 161 decodes the encoded search signal, which is entered from the radio transceiver unit 140, and the encoded direction check signal, which is entered from the optical receiver unit 150, to obtain the search signal and the direction check signal. Then, the decoder 161 outputs the search signal and the direction check signal to the data processor 162 at a subsequent stage.

The data processor 162 generates a reception report signal. Here, in this embodiment, the search signal includes a robot ID and a reception report request signal. Here, the robot ID is a unique identification number to identify the robot R which has transmitted the search signal. The reception report request signal is a signal which commands the RFID tag T to perform a predetermined processing when the RFID tag T has received the search signal.

In addition, the direction check signal includes the robot ID for identifying the robot R which has emitted the direction check signal, and the emitter ID for identifying the light emitter which has emitted the direction check signal.

Therefore, when the search signal is entered in the data processor 162, the data processor 162 changes the condition of the optical receiver unit 150 from a standby condition to an activated condition in response to the reception report request signal included in the search signal.

When the data processor 162 receives the direction check signal within a predetermined time after activating the optical receiver unit 150, the data processor 162 compares the robot ID included in the direction check signal with the robot ID included in the search signal.

The data processor 162 obtains a unique identification number (RFID number) which is documented in the RFID tag T from the recording unit 170, when the robot ID included in the direction check signal matches with the robot ID included in the search signal. Then, the data processor 162 generates the reception report signal in which the RFID number, the robot ID included in the search signal, and the emitter ID included in the direction check signal are included, and outputs the generated reception report signal to the encoder 163.

On the contrary, if the direction check signal is not entered in the optical receiver 151 within a predetermined time after activating the optical receiver unit 150, or if the robot ID of the direction check signal does not match with the robot ID of the search signal, the data processor 162 generates the reception report signal which further includes an emission request signal therein, and outputs the generated reception report signal to the encoder 163. Here, the emission request signal is a signal which commands the robot R to emit infrared light.

The encoder 163 encodes the reception report signal to generate the encoded reception report signal, and outputs the encoded reception report signal to the radio transceiver unit 140. Then, the encoded reception report signal is modulated in the modulator 143 of the radio transceiver unit 140 and transmitted wirelessly through the transceiver antenna 141.

[Configuration of Controller]

Figure 6:
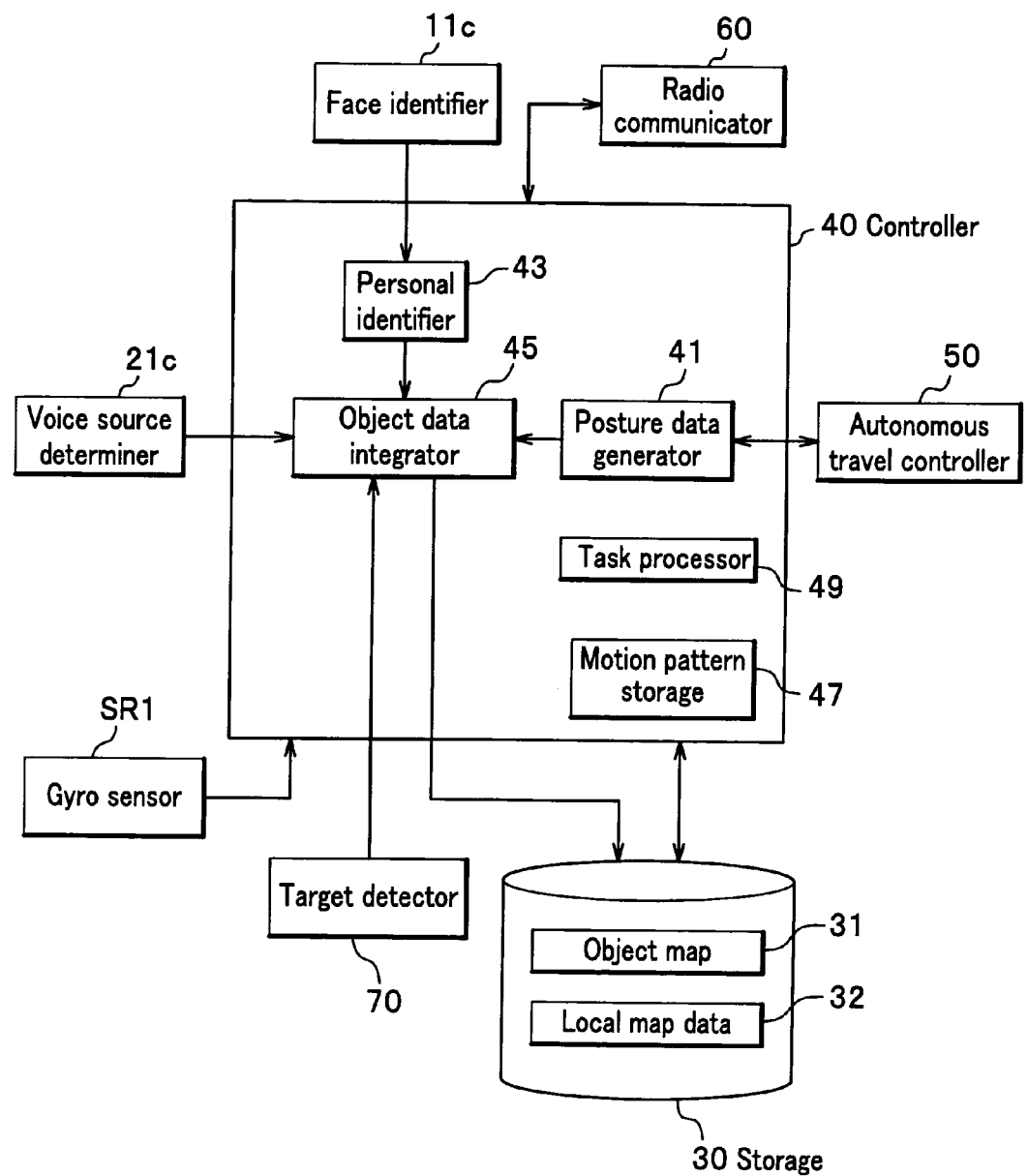
FIG. 6 is a block diagram showing a controller in detail.

A detailed configuration of the controller 40 of the robot R shown in FIG. 2 will be explained by referring to FIG. 6. FIG. 6 is a block diagram showing the controller 40 in detail. As shown in FIG. 6, the controller 40 includes a posture data generator 41, a personal identifier 43, an object data integrator 45, a motion pattern storage 47, and a task processor 49.

(Posture Data Generator)

The posture data generator 41 inputs motion data of the head R1 and the legs R3 from the autonomous travel controller 50, and based on the motion data, generates posture data indicating a relative position of the camera C against the gravity center of the robot R and a position of the robot R on a stage coordinate (a coordinate on the stage where the robot R travels). Then, the posture data generator 41 inputs the posture data in the object data integrator 45. The posture data generator 41 generates a control count (hereinafter, referred to as count) as an internal clock of the robot R, and supplies the count to the image processor 10, the voice processor 20, the target detector 70, and the object data integrator 45 of the controller 40.

(Personal Identifier)

The personal identifier (image identification means) 43 inputs a characteristic parameter, which is computed using face image data, from a face identifier 11c, and identifies a person who is imaged by the camera C with a given certainty, based on the above characteristic parameter and a characteristic parameter of specific face image data, which is stored in the storage 30 by obtaining it from the management computer 3 through the radio communicator 60. Then, the personal identifier 43 outputs the result to the object data integrator 45.

The personal identifier 43 searches a characteristic parameter, of which difference from the characteristic parameter outputted from the face identifier 11c is no more than a given threshold value, within the storage 30. Therefore, the specific face image data having the characteristic parameter which complies with this condition is regarded as the face image data corresponding to the characteristic parameter. In addition, the personal identifier 43 computes a degree of similarity of the person who has the characteristic parameter (specific face image data) by using the characteristic parameter outputted from the face identifier 11c and the characteristic parameter evaluated to be corresponding. Accordingly, an ID number of the person (a personal ID) and a certainty of the person (a personal certainty) (The ID number and the certainty are collectively called as personal data) are transferred to the object data integrator 45.

(Object Data Integrator)

The object data integrator 45, which will be described later in detail, generates integrated ID data which integrates the ID data (object data) of the target object D (object) based on input data from the posture data generator 41, the personal identifier 43, the target detector 70, and the voice source determiner 21c, and outputs the integrated ID data to the storage 30. Through this process, as described later, an object map 31 in which the object data is accumulated by object and by time is generated. The object map 31 is stored in form of a predetermined number of tables (cards) by time (by count).

(Motion Pattern Storage)

The motion pattern storage 47 stores a program for executing a predetermined motion (motion pattern) of the robot R, and when the motion pattern is executed, the motion pattern storage 47 refers to the object map 31 stored in the storage 30 and reflects it to the motion pattern.

The motion pattern is, for example, to stop with a distance of 1 m in front of an object when the robot R encounters a person or an obstacle (object) during walking, to raise the arm R2 to a predetermined position 10 seconds later after the stopping, and to hold the object if there is an input to a pressure sensor (not shown) of the arm R2. That is, a motion pattern for responding to the scene or the situation is prepared. Meanwhile, the motion pattern storage 47 is only one in FIG. 6. However, a plurality of motion pattern storages 47 are provided for each motion pattern.

(Task Processor)

The task processor 49 searches a route to a target place based on a command (task) transferred from the management computer 3 though the radio communicator 60, and combines the motion patterns in a predetermined order by controlling the motion pattern storage 47. Meanwhile, the task processor 49 stores a local map data 32 to the storage 30, and uses the map for searching a route. The local map data 32 is information of a map of the working area transferred from the management computer 3 through the radio communicator 60.

(Configuration of Object Data Integrator)

Figure 7:
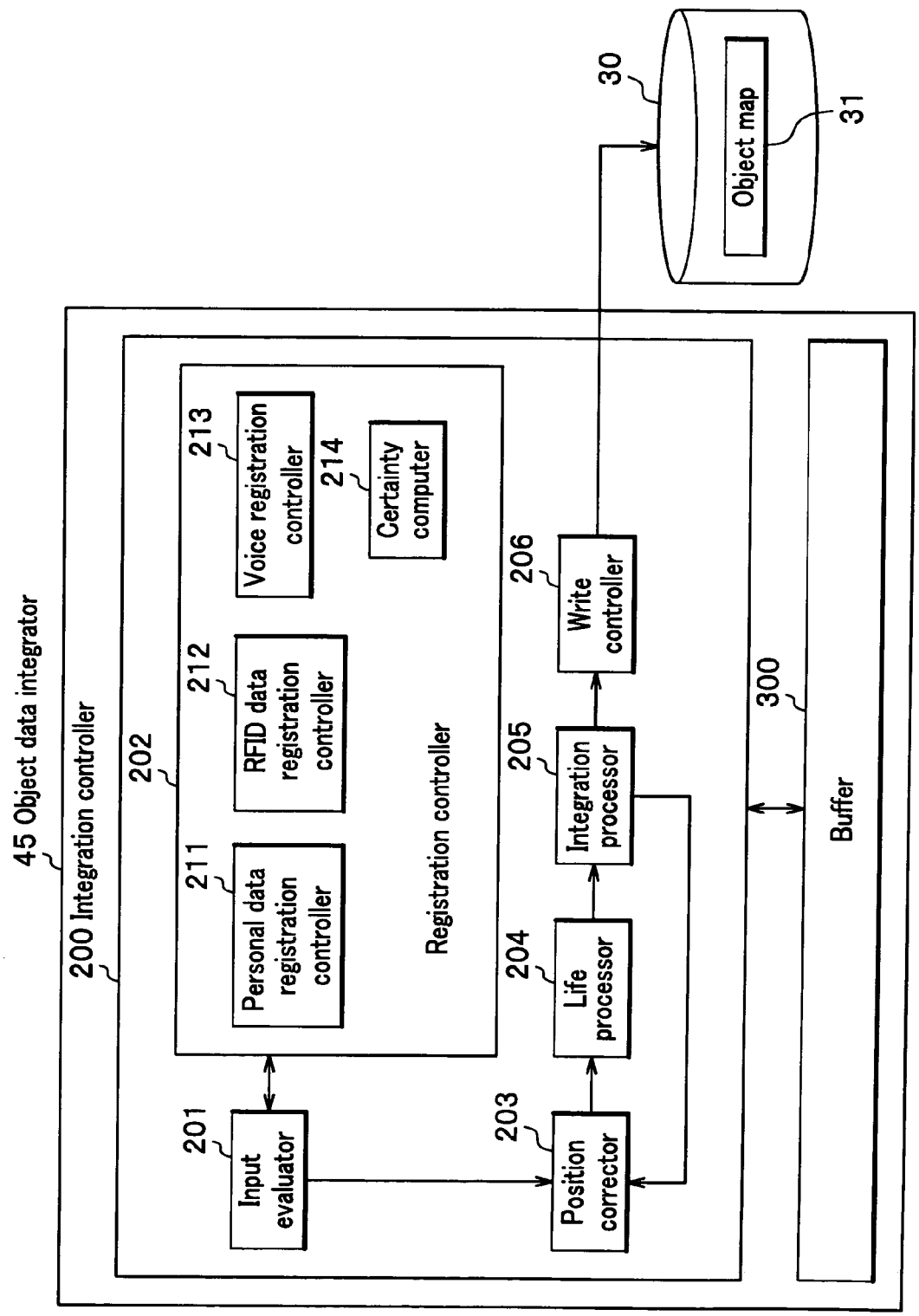
FIG. 7 is a block diagram showing an object data integrator in detail.

Next, a detailed configuration of the object data integrator 45 will be described by referring to FIG. 7. FIG. 7 is a block diagram showing the object data integrator 45 in detail. AS shown in FIG. 7, the object data integrator 45 includes an integration controller 200 and a buffer 300. The integration controller 200 generates the object map 31 to be stored in the storage 30. The integration controller 200 includes an input evaluator 201, a registration controller 202, a position corrector 203, a life processor 204, an integration processor (target object determining means) 205, and a write controller 206, for managing and storing a temporary map in the buffer 300, which is a temporary storage. The temporary map is generated on the way for generating the object map 31.

The input evaluator 201 transfers control of data, which enters the integration controller 200 depending on a character of the data, to the registration controller 202 or the position corrector 203.

When object data is inputted to the integration controller 200, the registration controller 202 registers the input data to the temporary map stored in the buffer 300. The registration controller 202 includes a personal data registration controller 211, an RFID data registration controller 212, a voice registration controller 213, and a certainty computer (certainty computing means) 214.

The personal data registration controller 211 controls a registration in the temporary map when object data entered in the integration controller 200 is personal data (For example, a personal ID, position, speed.)

The RFID data registration controller 212 controls a registration in the temporary map when object data entered in the integration controller 200 is RFID data (For example, RFID position, RFID number), and sends data back and forth between the controller 212 and the certainty computer 214.

The voice registration controller 213 controls a registration in the temporary map when object data entered in the integration controller 200 is voice source ID data (For example, a voice source position), and sends data back and forth between the controller 213 and the certainty computer 214. Meanwhile, the details of the control for the registrations implemented by each controller (controllers 211, 212, and 213) of the registration controller 202 will be described later.

The certainty computer (certainty computing means) 214 computes an RFID certainty PR (%) which indicates the certainty of the RFID data (RFID number) expressed in the formula (1), based on the RFID data (RFID life count LC) outputted from the RFID data registration controller 212 and a life LT2, which is determined in advance, of the RFID data. Meanwhile, the RFID life count LC is an elapsed time (count) of the RFID data on the object map 31.

$$PR=100-(LC\times 100/LT2) \quad (1)$$

In addition, the certainty computer 214 computes a voice source certainty which indicates a certainty of a personal (object) voice source, based on voice source ID data (voice source position) and a gravity center coordinate of the person (object) outputted from the face identifier 11c. For example, the voice source certainty is computed from an error rate of the voice source position (rotation angle $\theta_z$ in Z axis direction) against a rotation angle $\theta_z$ in a Z axis direction based on the gravity center coordinate which is outputted from the face identifier 11c.

The position corrector 203 corrects position information of the object data on the temporary map which is stored in the buffer 300, based on posture data entered in the integration controller 200.

The life processor 204 sets a life of the object data on the temporary map which is stored in the buffer 300, and deletes the object data of which life has run out from the temporary map. The life processor 204 sets a specific life to the personal data, the RFID data, and the voice source ID data, respectively. Meanwhile, it may be possible to delete the object data from the temporary map based on a life set in advance.

The integration processor (target object determining means) 205 generates integrated ID data to be used as singuler ID data for one object, based on the personal data and the RFID data. The integration processor 205 determines a TOTAL_ID (ID number) based on the certainties of the personal data and the RFID data, when the ID numbers indicated by the personal data and the RFID data are matched. In this case, a TOTAL_certainty which is the certainty of the TOTAL_ID is also determined. In addition, the integration processor 205 consolidates objects when one integrated ID data of one object and another integrated ID data of another object on the temporary map are evaluated to be identical.

The write controller 206 evaluates a write timing whether or not a timing is a predetermined write timing, and if the timing is the predetermined timing, the write controller 206 writes the latest temporary map stored in the buffer 300 into the storage 30 as newest data of the object map 31 in the storage 30. Meanwhile, in the writing, an oldest card is discarded so that the number of cards of the object map 31 becomes to be a predetermined number. In addition, for example, a timing after a predetermined time has elapsed, a timing when one of the ID date has been inputted, and a timing of each image frame of the camera C, may be employed as the predetermined write timing.

[Configuration of Object Map]

Next, a configuration of the object map 31 stored in the storage 30 will be explained by referring to FIG. 8. FIG. 8 is an illustration for explaining the object map.

The object map 31 includes a plurality of data by a time 801 (hereinafter, referred to as card 801) which is sorted by time (according to time). In the card 801, a count (time information), posture data and a camera angle, and a table 803 are recorded on the card. The posture data is expressed, for example, with a face position (x, y, z) and a face direction ($\theta_x$, $\theta_y$, $\theta_z$), and the camera angle is expressed, for example, with rotation angels (pan, tilt, role) around each axis of the pan, the tilt, and the role. In addition, in the table 803, a target to be identified (object) are arranged in column, and a plurality of items which characterize the object is arranged in row. That is, records are stored by object (by column) in the table 803. The items will be explained below in detail, respectively.

An object number 804 is given up to M pieces in maximum in order of object detection by the robot R. In the table 803, 11 pieces of objects from "0" to "10" can be managed.

A body position 805 is position coordinate data outputted from the image processor 10, and expressed by a gravity center position coordinate (x, y) of a person (object) on a coordinate plane that the robot R recognizes.

A speed 806 is speed data outputted from the image processor 10, and expressed with traveling speeds ($V_x$, $V_y$) of a person (object) on the coordinate plane that the robot R recognizes.

A personal ID 807 is data outputted from the personal identifier 43, and expressed with an ID number of a person (object) such as "10032".

A personal certainty 808 indicates a certainty of the personal ID 807, and 100% corresponds to complete matching of the similarity which is computed in the personal identifier 43. Meanwhile, the similarity as it is may also be used as the personal certainty 808.

A personal life count 809 indicates an elapsed time (age) of the data registered in the personal ID 807 on the object map 31.

An RFID number 810 is an ID number of a person (object) recorded in a tag, for example, written in such as "10032", and outputted from the target detector 70.

A RFID position 811 is position data outputted from the target detector 70, and expressed with an area determined by a distance and a direction to the tag (object) from the robot R.

A RFID certainty 812 indicates a certainty of data (ID number) of the RFID number 810, and is derived using the formula (1) by a certainty computer 214.

A RFID life count 813 indicates an elapsed time (age) of the data (ID number) stored in the RFID number 810 on the object map 31.

A voice source position 814 is data outputted from the voice source determiner 21c, and expressed with an angle $\theta_z$ of a person (object) producing a voice on a coordinate plane where the robot R recognizes.

A voice source certainty 815 indicates a certainty of data of the voice source position 814, and is computed with the certainty computer 214. Meanwhile, it may be available to show the certainty with a flag which indicates whether or not the person (object) is producing a voice, instead of the voice source position 814 and the voice source certainty 815.

A voice source life count 816 indicates an elapsed time (age) of data (position coordinate) stored in the voice source position 814 on the object map 31.

An object life count 817 is a count which starts when any one of the personal data, the RFID data, and the voice source ID data have been inputted to the object.

A TOTAL_ID 818 is an ID number of the object determined by the integration processor 205 based on the personal ID 807 and the RFID number 810.

A TOTAL_ID 819 is a certainty of an ID number of the object determined by the integration processor 205 based on the personal certainty 807 and the RFID certainty 812. Meanwhile, the integration processor 205 may regard the voice source certainty 815 for determining the TOTAL_ID 819.

<Operation of Target Object Detection System>

Next, processing implemented in the target object detection system A will be explained.

[Operation of Target Detector]

First, a processing implemented in the target detector 70 of the robot R will be explained (refer to FIG. 3 and FIG. 5 as needed).

The controller unit 80 of the target detector 70 generates, at a predetermined cycle, a direction check signal (an infrared signal) which includes a robot ID and an emitter ID for each emitter, as well as generating a search signal which includes the robot ID stored in the recording unit 110 and a reception report request signal. A radio transceiver unit 90 modulates an encoded search signal with a predetermined modulation scheme and outputs the encoded search signal wirelessly. In addition, a light emission unit 100 radiates an infrared light (encoded and modulated search signal) on each search region established around the robot R in the order and timing determined by a time divider 83.

When the RFID tag T receives the search signal (wireless communication) and the direction check signal (infrared light), the RFID tag T refers to the recording unit 170 whether or not the robot IDs in the two signals are same, and generates a reception report signal (modulated signal) which includes a specific ID number (RFID number) assigned to the RFID tag T. Then, the RFID tag T wirelessly transmits the unique ID number.

The radio transceiver unit 90 of the target detector 70 of the robot R receives and demodulates the reception report signal (modulated signal) wirelessly transmitted from the RFID tag T. Further, the controller unit 80 decodes the demodulated signal and obtains the reception report signal. The field intensity detector 85 of the controller unit 80 detects power of the encoded reception report signal, and computes an average of the detected power. Then, the field intensity detector 85 outputs the computed average value as the data of the field intensity to the data processor 81.

The position determiner 81b of the data processor 81 refers to the distance table stored in the recoding unit 110 according to the field intensity entered from the field intensity detector 85, and obtains information (area information) which indicates an area where the tag T, which has transmitted the reception report signal, exists. In addition, the position determiner 81b refers to the direction table stored in the recording unit 110 according to the emitter ID included in the reception report signal. Then, the position determiner 81b obtains information (direction information) which identifies the light emitter which has radiated an infrared light received by the RFID tag T. Further, the position determiner 81b identifies the position (tag position) of the object target D (RFID tag T) from the area information and the direction information, and generates an RFID position based on the identified tag position and posture data of the robot R obtained from the controller 40. Meanwhile, the target detector 70 outputs the obtained RFID number to the controller 40.

[Operation of Object Data Integrator]

Figure 9:
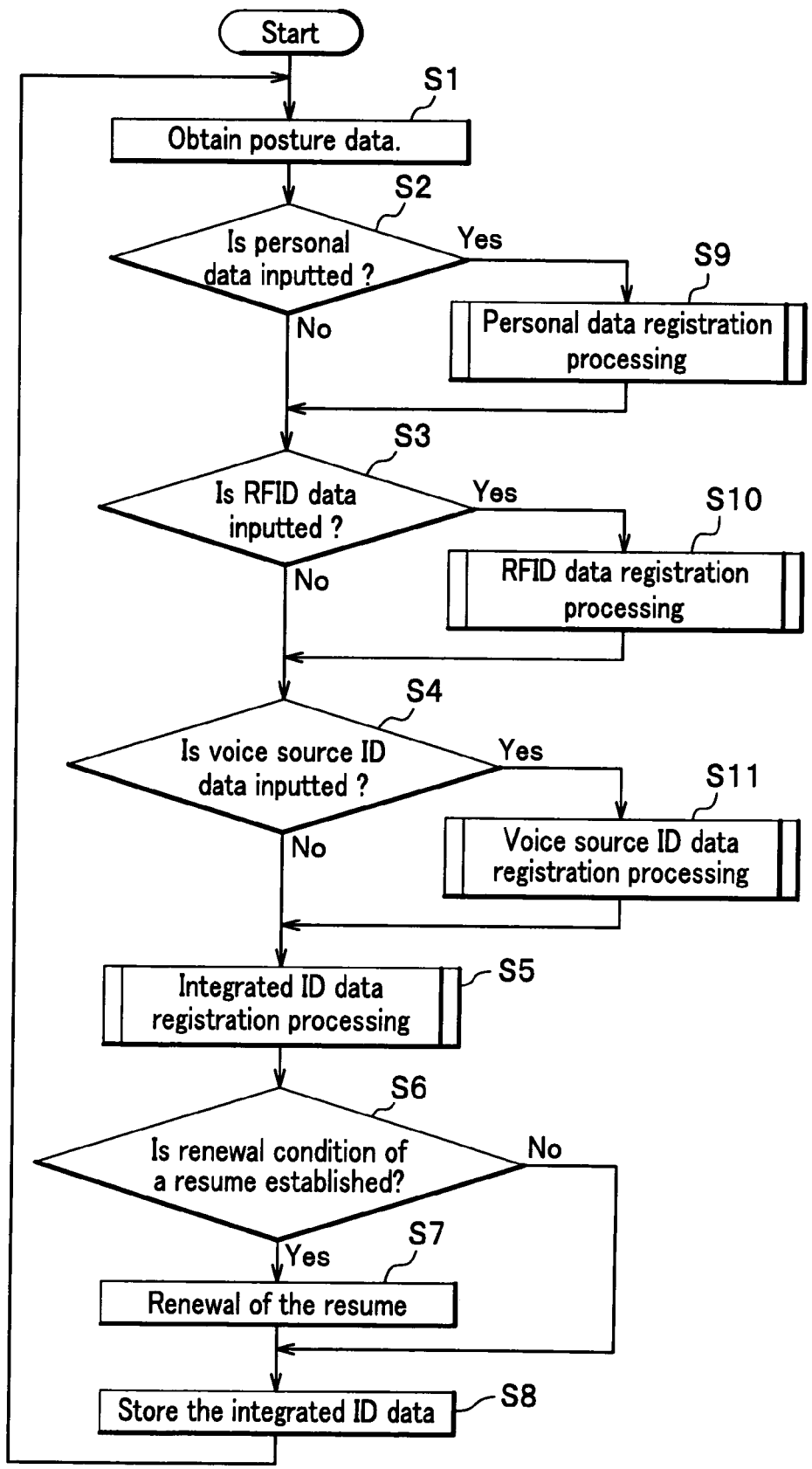
FIG. 9 is a flowchart showing a total operation of an object data integrator.

Next, an operation of the object data integrator 45 will be explained by referring to FIG. 9 (refer to FIG. 6 and FIG. 7, as needed). FIG. 9 is a flowchart showing a total operation of the object data integrator 45.

First, the object data integrator 45 obtains posture data and a control count from the posture data generator 41 (step S1). Meanwhile, the posture data and the control count are used in integrated ID data registration processing, which will be described later (step S5).

The object data integrator 45 evaluates whether or not personal data is entered from the personal identifier 43, using an input evaluator 201 (step S2).

When the personal data is inputted (step S2: Yes), the input evaluator 201 outputs the personal data to a personal data registration controller 211. The personal data registration controller 211 implements personal data registration processing (step S9) described later, and registers the inputted personal data in a temporary map of the buffer 300. Following to this processing (step S9), or if the personal data is not inputted yet (step S2: No), the object data integrator 45 evaluates whether or not the RFID data is inputted from the target detector 70, using the input evaluator 201 (step S3).

When the RFID data is inputted (step S3: Yes), the input evaluator 201 outputs the RFID data to the RFID data registration controller 212. The RFID data registration controller 212 implements RFID data registration processing (step S10) described later, and registers the inputted RFID data on the temporary map in the buffer 300. Following to this processing (step S10), or if the RFID is not inputted yet (step S3: No), the object data integrator 45 evaluates whether or not the voice source ID data is entered from the certainty computer 214, using the input evaluator 201 (step S4).

When the voice source ID data is entered (step S4: Yes), the input evaluator 201 outputs the voice source ID data to a voice source ID data registration controller 213. The voice source ID data registration controller 213 implements a voice source ID data registration processing (step S11) described later, and registers the inputted voice source ID data on the temporary map in the buffer 300. Following to this processing (step S11), or if the voice source ID data is not inputted yet (step S4: No), the object data integrator 45 implements an integrated ID data registration processing described later to complete the temporary map stored in the buffer 300 (step S5). Meanwhile, the personal data, the RFID data, and the voice source ID data are inputted to the object data integrator 45 in different timings, respectively, to each other in general.

The object data integrator 45 evaluates whether or not a resume renewal condition of the object map 31 in the storage 30 is established by using a write controller 206 (step S6). When the condition is established (step S6: Yes), the write controller 206 implements an update of the resume for preparing a latest card by deleting the oldest card, so that the number of cards of the object map is maintained to be a constant (step S7). Then, the object data integrator 45 writes, using the write controller 206, a given number of cards of the temporary map into the object map 31 (step S8), so as to store the latest data (integrated ID data) of the temporary map of the buffer 300 into the latest card of the object map 31, and the step returns to the step S1. If the resume update condition is not established (step S6: No), the object data integrator 45 proceeds to the step S8. Meanwhile, in this case, only the latest card of the object map 31 is overwritten and stored.

(Personal Data Registration Processing)

Figure 10:
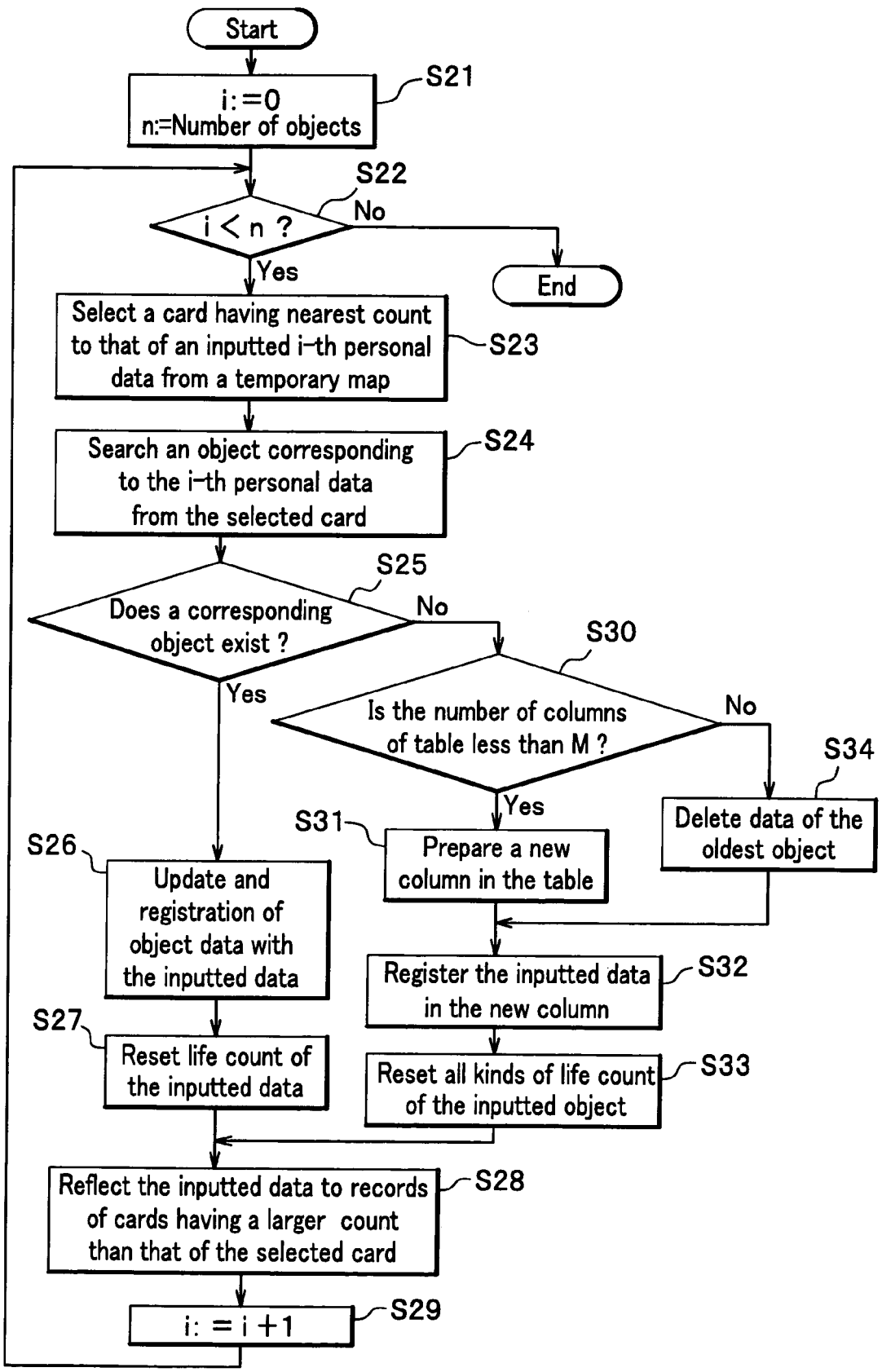
FIG. 10 is a flowchart for explaining an operation of personal data registration processing.

Next, the personal data registration processing at the step S9 described above will be explained by referring to FIG. 10 (refer to FIG. 8 and GIG. 8 as needed). FIG. 10 is a flow-chart showing an operation of the personal data registration processing. First, the personal data registration controller 211 sets an object number n for the inputted personal data, while setting 0 (zero) for a control variable i (step S21). Then, the personal data registration controller 211 evaluates whether or not the i is less than n (step S22), and if the i is not less than n (step S22: No), the personal data registration controller 211 terminates the processing. On the contrary, if the i is less than n (step S22: Yes), the personal data registration controller 211 selects a card, which has the nearest count to a count attached to the inputted personal data, from the temporary map of the buffer 300 (step S23). Then, the personal data registration controller 211 searches an object corresponding to the i-th inputted personal data from the card (step S24).

The personal data registration controller 211 evaluates whether or not an object corresponding to the above condition exists (step S25), and if the corresponding object exists (step S25: Yes), the personal data registration controller 211 updates the personal data of the temporary map of the buffer 300 with the inputted personal data (step S26). In this case, data of the body position 805, the speed 806, the personal ID 807, and the personal certainty 808 are also updated. Then, the personal data registration controller 211 resets (sets to 0 (zero)) the personal life count 809 of the registered object (step S27), and reflects the registered personal data to a record of this object in a card which has a larger count than that of the selected card (step S28). In addition, the personal data registration controller 211 increments the control variable from i to i+1 (step S29), and the step returns to the step S22.

When an object corresponding to the inputted personal data does not exist (step S25: No), the personal data registration controller 211 evaluates (step S30) whether or not a column number in the table 803 of the temporary map of the buffer 300 is no more than M (maximum column number). If the column number of the table 803 is less than M (step S30: Yes), the personal data registration controller 211 generates a new column in the table 803 (step S31), and newly registers the inputted personal data in the generated column (step S32). In this case, the body position 805, the speed 806, the personal ID 807, and the personal certainty 808 are also registered. Then, the personal life count 809, the RFID life count, and the voice source life count 816 of the object are all reset to 0 ("zero") by the personal data registration controller 211 (step S33), and the step proceeds to the step S28.

On the other hand, when the column number in the table 803 is M (maximum column number), the personal data registration controller 211 deletes (step S34) the record (object data) in the object column which has the largest (oldest) personal life count 809 within the table 803, and the step proceeds to the step S32. In this case, the inputted personal data is newly registered in the column which is made null (empty).

(RFID Data Registration Processing)

Figure 11:
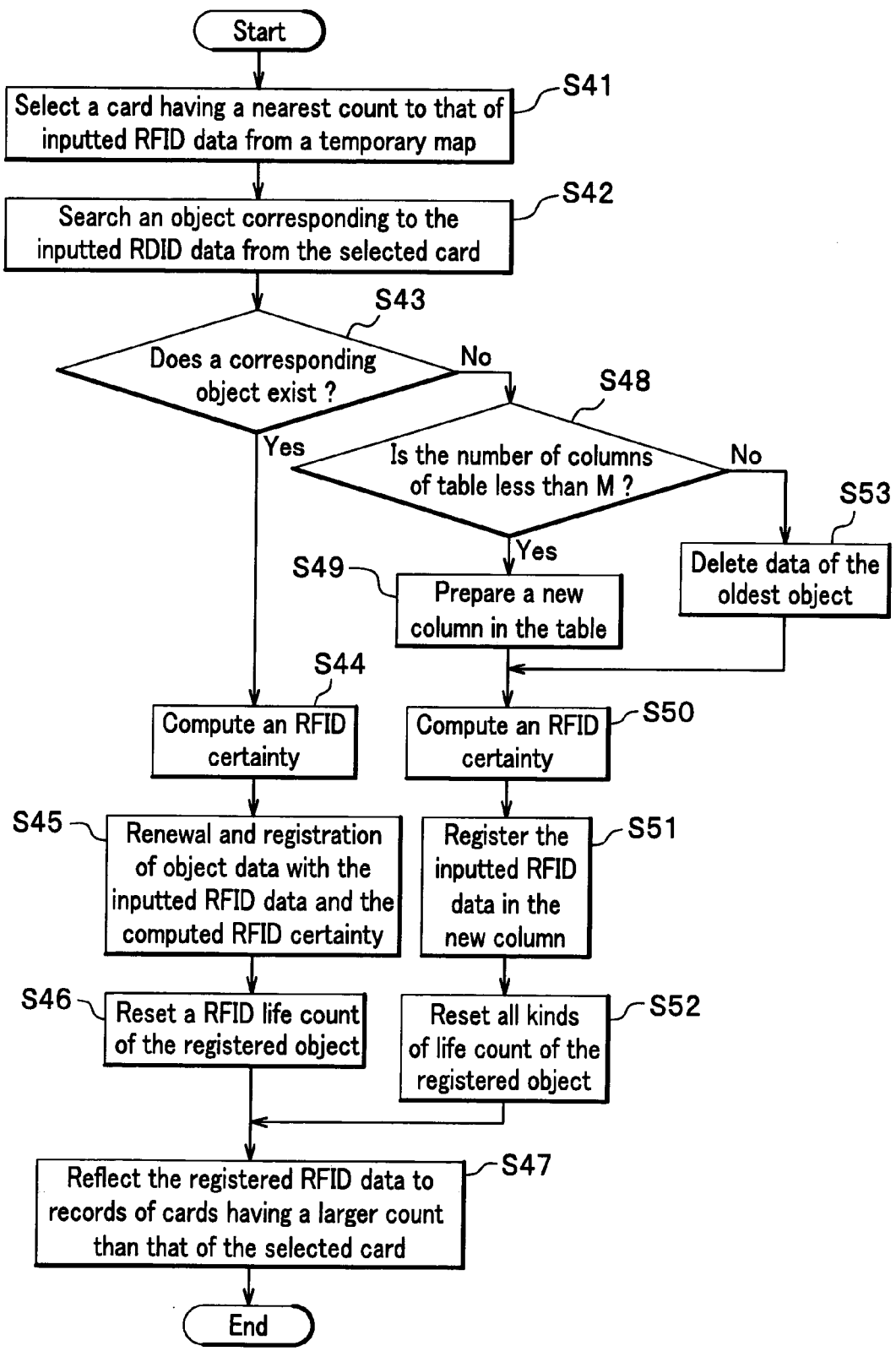
FIG. 11 is a flowchart for explaining an operation of RFID data registration processing.

Next, the RFID data registration processing at the step S10 described above will be explained by referring to FIG. 11. FIG. 11 is a flowchart showing the RFID data registration processing. First, the RFID data registration controller 212 selects a card which has a nearest count to the count attached to the inputted RFID data from the temporary map of the buffer 300 (step S41). Then, the RFID data registration controller 212 searches an object corresponding to the inputted RFID data from the card (step S42).

The RFID data registration controller 212 evaluates whether or not the corresponding object exists in the card (step S43), and if the corresponding object exists (step S43: Yes), the certainty computer 214 computes the RFID certainty (step S44) which indicates the certainty of the ID number based on the aforementioned formula (1). Then, the RFID data registration controller 212 updates the selected card (step S45) with the inputted RFID data and the computed RFID certainty. In this case, each data of the RFID number 810, the RFID position 811, and the RFID certainty 812 is updated. Then, the RFID data registration controller 212 resets (sets 0 "zero") the RFID life count 813 of the registered object (step S46), and reflects the registered RFID data to a record of this object in a card which has a larger count than that of the selected card (step S47).

When an object corresponding to the inputted RFID data does not exist (step S43: No), the RFID data registration controller 212 evaluates (step S48) whether or not a column number in the table 803 of the selected card is no more than M (maximum column number). When the column number of the table 803 is less than M (step S48: Yes), the RFID data registration controller 212 generates a new column in the table 803 (step S49). Then, the RFID data registration controller 212 computes the RFID certainty (step S50) by the certainty computer 214 same as with the step S44. Further, the RFID data registration controller 212 newly registers the inputted RFID data in the column which is generated at the step S49 (step S51). In this case, each data of the RFID number 810, the RFID position 811, and the RFID certainty 812 is registered. Then, the RFID data registration controller 212 resets (sets 0 "zero") the personal life count 809 of this object, the RFID life count, and the voice source life count 816, and the step proceeds to the step S47.

On the other hand, when the column number of the table 803 is M (maximum column number)(step S48: No), the RFID data registration controller 212 deletes (step S53) a record (object record) in the column of the object which has the largest (oldest) number of the RFID life count 813 within the table 803, and the step proceeds to step S50. In this case, the inputted RFID is newly registered in the column which is made null (empty).

(Voice Source ID Data Registration Processing)

The voice source ID registration processing at the aforementioned step S11 is similar to the RFID data registration processing which has been explained by referring to FIG. 11 except an entity of a control subject and a kind of data. Therefore, the explanation will be omitted. Meanwhile, a computing process of the voice source certainty corresponding to the steps S44 and S45 is implemented based on the voice source position and the body position.

(Integrated ID Data Registration Processing)

Figure 12:
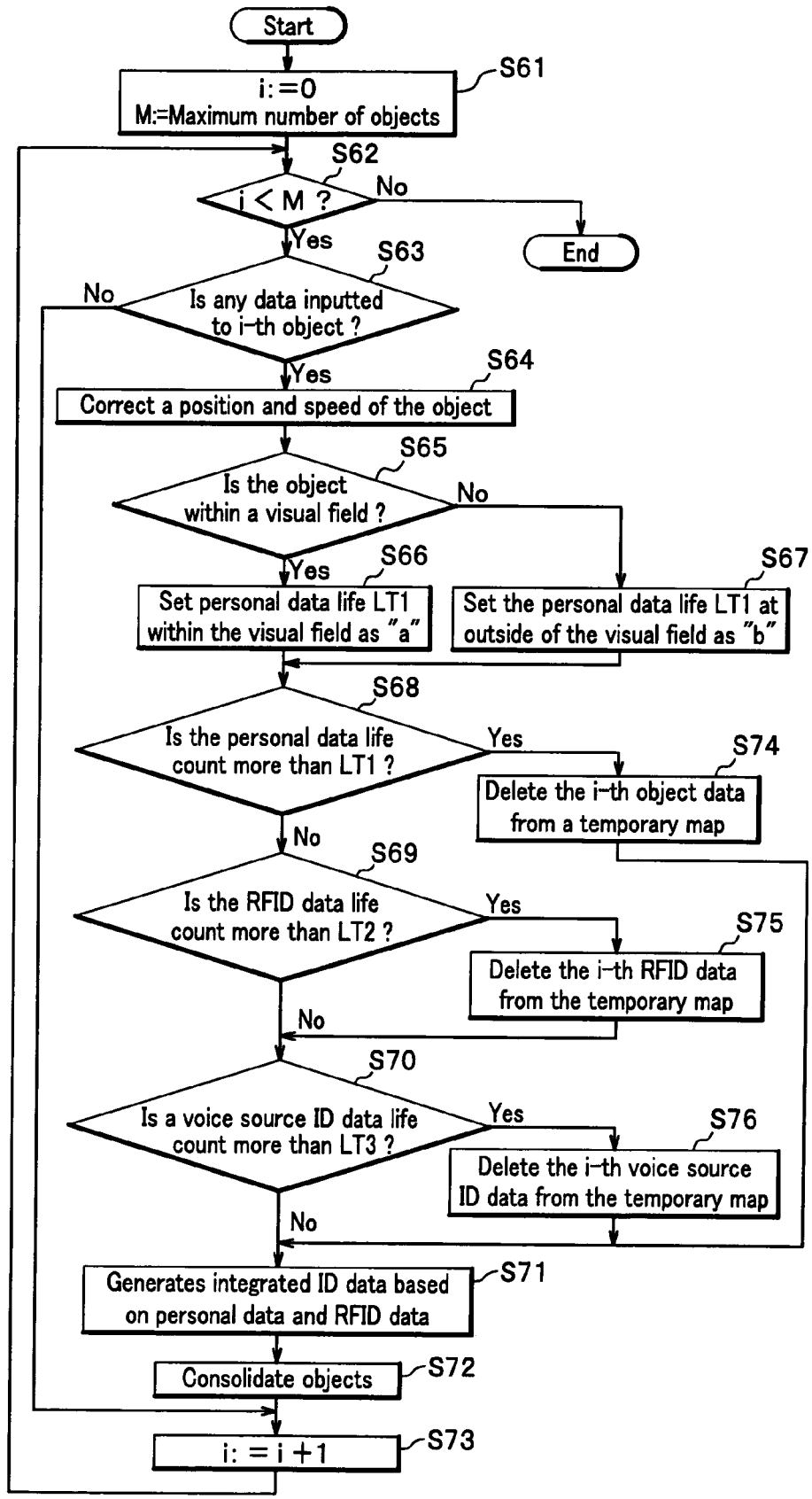
FIG. 12 is a flowchart for explaining an operation of integrated ID data registration processing.

Next, the integrated ID data registration processing at the aforementioned step S5 will be explained by referring to FIG. 12. FIG. 12 is a flow-chart showing an operation of the integrated ID data registration processing. First, the object data integrator 45 sets M as a maximum object number (a number of columns on the table of the object map 31), while setting the control variable i to 0 (zero) by the position corrector 203 (step S61). Then, the position corrector 203 evaluates whether or not the i is no more than M (step S62), and if the i is more than M (step S62: No), the position corrector 203 terminates the processing. On the contrary, if the i is less than M (step S62: Yes), the position corrector further evaluates whether or not inputted data of the i-th object exists (step S63). If the inputted data does not exist, the step proceeds to step S73 described later. If the inputted data exists, the position corrector 203 corrects the body position 805 and the speed 806 of the i-th object on the latest card of the temporary map in the buffer 300 based on the inputted posture data (stem S64). Meanwhile, in this case, the RFID position 811, the RFID certainty 812, the voice source position 814, and the voice source certainty may by corrected.

Figure 13:
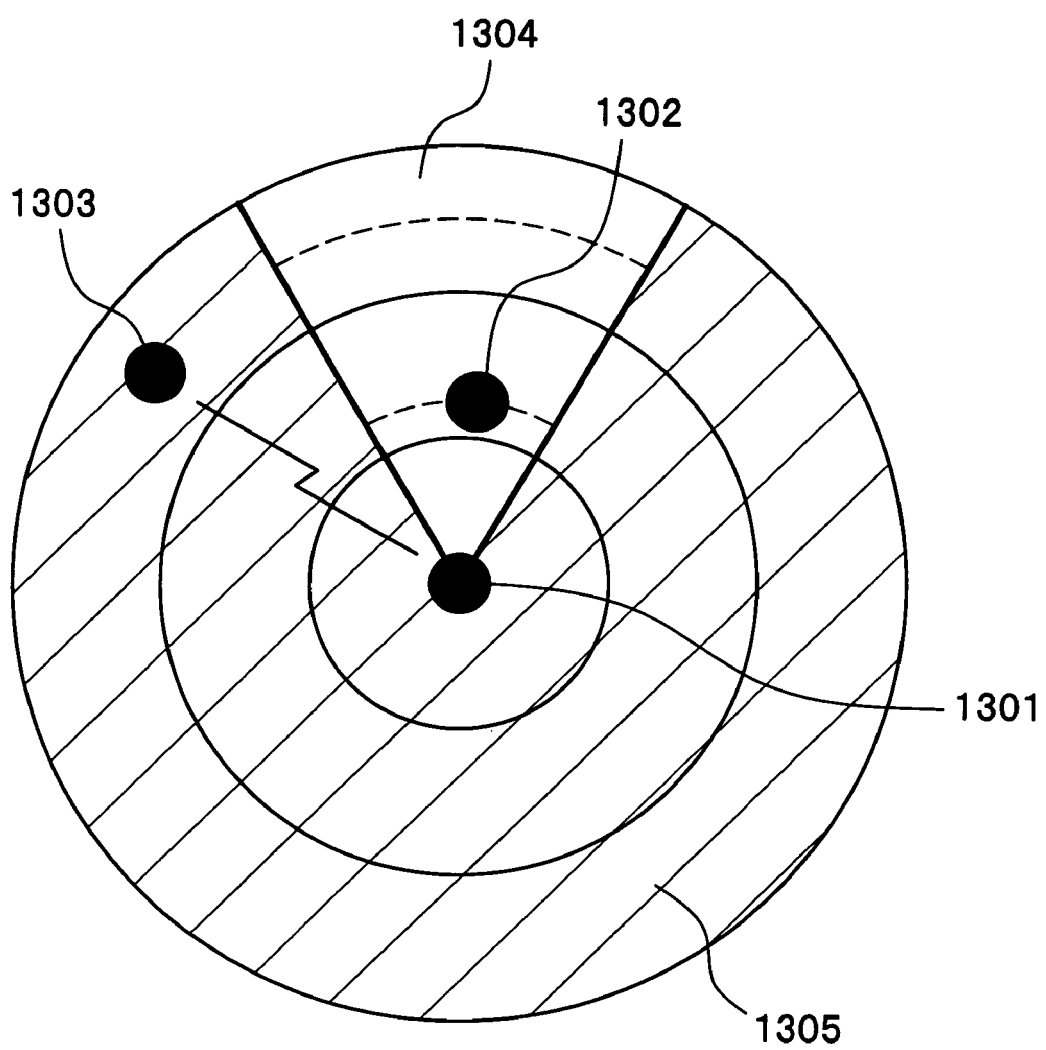
FIG. 13 is an illustration for explaining a visual field of a camera of a robot.

Next, the object data integrator 45 evaluates whether or not the i-th object exists within a visual field of the cameras C, C of the robot R, using the life processor 204 (step S65). FIG. 13 is an illustration for explaining the visual field of a robot. In FIG. 13, it is assumed that a robot 1301 is positioned at the center of a predetermined area, and an object 1302 exists in front of the camera (upper in FIG. 13) and an object 1303 exists in the left hand (diagonally upper left in FIG. 13) of the camera. In this case, the object 1302 is positioned within a camera visual field 1304, and the object 1303 is positioned in non-camera visual field 1305. However, the non-camera visual field 1305 is an area to be the camera visual field if the robot 1301 turns to the left with a given angle, or an area where a position can be identified from the RFID tag or the voice source position.

The explanation will be continued by returning to FIG. 12. When the object exists within the visual field (step S65: Yes), the life processor 204 sets a predetermined value a (step S66) as a life LT1 of the personal data, and also sets a predetermined value b (b>a) (step S67) as the life LT1 of the personal data when the object exists out of the visual field (step S65: No). By setting the value a (for example, 1 to 2 seconds) of the life LT1 in the visual field smaller than the value b (for example, 10 seconds) of the LT1 out of the visual field, the life processor 204 may leave the object on the object map 31 for a long time when the object existing in the visual field has moved to out of the visual field. In this case, on the contrary, since a life of the object in the visual field is short, an afterimage of the object in the visual field can be removed relatively quickly.

Following to the step S66 and step S67, the object data integrator 45 evaluates whether or not a personal life count 809 of the personal data of the i-th object is larger than the life LT1 of the personal data by using the life processor 204 (step S68). Then, if the personal life count 809 is no more than the life LT1 of the personal data (step S68: No), the object data integrator 45 evaluates whether or not a RFID life count 813 of the RFID data of the i-th object is larger than a life LT2 of the RFID data by using the life processor 204 (step S69). If the RFID life count 813 is no more than the life LT2 of the RFID data (step S69: No), the object data integrator 45 evaluates whether or not a voice source life count 816 of the voice source ID data of the i-th object is larger than a life LT3 of the voice source ID data (step S70).

Then, if the voice source life count 816 is no more than the life LT3 of the voice source ID data (step S70: No), the object data integrator 45 generates integrated ID data based on the personal data of the i-th object and the RFID data by using the integration processor 205 (step S71). Here, a TOTAL_certainty 819 is determined based on the personal certainty 808 and the RFID certainty 812, as well as a TOTAL_ID 818 is determined based on the personal ID 807 and the RFID number 810. Through the above process, the robot R identifies the i-th object with a certainty of the TOTAL_certainty 819.

In the step S71, if the ID numbers of the personal data and the RFID data are different, data which has a higher certainty between the personal data and the RFID data is prioritized. In this case, the TOTAL_certainty is, for example, an average of the two certainties.

Here, processing at the step S71 will be explained by referring to FIG. 8. In the example shown in FIG. 8, an object whose object number 804 is "1" has "54" for the personal ID 807, "80%" for the personal certainty 808, "54" for the RFID number 810, and "80%" for the RFID certainty 812. In this case, since the personal ID 807 and the RFID number 810 are same, the TOTAL_ID 818 is set as "54" according to the above correspondence. In addition, since both of the personal certainty 808 and the RFID certainty 812 are 80%, a total certainty is increased, thereby the TOTAL_certainty 819 may become, for example, "90%".

On the other hand, an object whose object number 804 is "0" has "5" for the personal ID 807, "60%" for the personal certainty 808, "32" for the RFID number 810, and "40%" for the RFID certainty 812. In this case, the personal ID 807 and the RFID number 810 are different to each other. However, since the personal certainty 808 is larger than the RFID certainty 812, the personal ID 807 is set as the TOTAL_ID 818. That is, the TOTAL_ID 818 is set to be "5". In addition, the TOTAL_certainty 819 is set to be "50%", which is the average of "60%" of the personal certainty 808 and "40%" of the RFID certainty 812.

Further, when the personal ID 807 and the RFID number 810 are different and the certainties of the personal ID 807 and the RFID number 810 are equal, for example, the personal ID 807 is prioritized. In this case, a reading error of the RFID tag T and an error caused by incorrect attachment of the tag can be avoided. Meanwhile, if the RFID number 810 is prioritized, an image data error due to night or out of the visual field of the camera C can be avoided.

Again, the explanation of the integrated ID data registration processing will be continued by referring to FIG. 12. Following to the step S71, the object data integrator 45 compares the integrated ID data of the i-th object and the integrated ID data of (i−k)-th (k=1, 2 . . . , i−1) object by using the integration processor 205, and if the both integrated ID data are same, the object data integrator 45 consolidates the (i−k)-th object into the i-th object (step S72). With the above process, for example, when two objects, which are practically one object, are identified through the personal identification (image processing), an accuracy of the object identification can be improved.

Following to the step S72, the object data integrator 45 increments the control variable i from i to i+1, using the position corrector 203 (step S73), and the step returns to the step S62.

In addition, in the integrated ID data registration processing shown in FIG. 12, when the personal life count 809 is larger than the life LT1 of the personal data (step S68: Yes), the object data integrator 45 deletes the i-th object data (personal data, RFID data, voice source ID data) from the temporary map in the buffer 300 (step S74) by using the life processor 204, and the step proceeds to step S71. That is, in the example shown in FIG. 8, a record of the "i" column of the object number 804 is deleted from the table 803.

Also, when the RFID life count 813 is larger than the life LT2 of the RFID data (step S69: Yes), the object data integrator 45 deletes the i-th RFID data (RFID number 810, RFID position 811, RFID certainty 812, and RFID life count 813) from the temporary map in the buffer 300 (step S75) by using the life processor 204, and the step proceeds to step S70. Further, when the voice source count 816 is larger than the life LT3 of the voice source ID data (step S70: Yes), the object data integrator 45 deletes the i-th voice source ID data (voice position 814, voice source certainty 815, voice source life count 816) from the temporary map in the buffer 300 (step S76) by using the life processor 204, and the step proceeds to step S71. Meanwhile, the life LT2 of the RFID data and the LT3 of the voice source ID data are determined in advance.

[Operation of Robot Based on Command]

An operation of the robot R will be explained by using an example where a target object detection system A is applied to deliver goods to an addressee by a request of a requester who is in the same office with the addressee.

In this case, information (name, etc.) of a person with the RFID tag T is inputted from the terminal 5 (refer to FIG. 1), and the information is registered in a storage (not shown) of the management computer 3 which is connected to the terminal 5 through the network 4. After completing the input from the terminal 5, the requester (a person who requests delivery of the good) and the addressee (a person who receives the goods) wait at predetermined position with the RFID tag T, respectively.

On the other hand, an operator of the terminal 5 inputs names of the requester and the addressee, and a delivery command from the terminal 5. Then, the management computer 3 reads an ID number and position information (seat position within the office) of the requester, an ID number and position information (seat position within the office) of the addressee, local map data (map in the office), and characteristic parameters of face image data of the requester and the addressee, from the storage (not shown), and transmits these data to the robot R.

The controller 40 (refer to FIG. 2) of the robot R stores data which is obtained from the management computer 3 through a radio communicator 60 in the storage 30, and a task processor 49 (refer to FIG. 6) of the controller 40 implements a delivery task based on a command (instruction) from the management computer 3. The task processor 49 combines motion patterns in a predetermined order by controlling a motion pattern storage 47, as well as searching a route to the position of the addressee. Through the above, the robot R sequentially implements each operation and motion, for example, a route search and traveling from a current position (home position) of the robot R to the position of the requester, an identification of the requester, a reception of the goods, a route search and traveling from a position of the requester to the position of the addressee, an identification of the addressee, a delivery of the goods, and a route search and traveling from the position of the addressee to the home position.

Meanwhile, when the robot R travels, the task processor 49 searches a minimum route to a target place by implementing a motion pattern which avoids an obstacle by referring to the local map data 32.

The motion pattern storage 47, which is controlled by the task processor 49, refers to the object map 31 as needed in the storage 30, and confirms whether or not a person who is at the addressed position is the requester or the addressee, then, implements the reception or the delivery of the goods. In this case, the object map 31 is arbitrarily and continuously updated to the latest one. Meanwhile, when the goods are received or delivered, a pressure sensor (not shown) in the arm R2 of the robot R detects a given suppressing force or a pulling force, and the robot R implements a motion for softly holding or opening the palm for the each scene.

In addition, when the robot R identifies the requester at a position where the requester is to be (seat of the requester), the motion pattern storage 47, which handles a speech, reads conversation data corresponding to the requester from the storage 30 and outputs it to a voice synthesizer 21a (refer to FIG. 2). Then, a voice, for example, "Please hand me . . . " is outputted. Similar to the above, when the robot R identifies the addressee at the position where the addressee is to be (seat of the addressee), the motion pattern storage 47, which handles a voice output, reads conversation data corresponding to the addressee from the storage 30 and outputs it to a voice synthesizer 21a (refer to FIG. 2). Then, a voice, for example, "Please receive . . . " is outputted.

Meanwhile, in this case, in processing of the integration processor 205 (refer to FIG. 7), when the personal ID 807 and the RFID number 810 are different, a name corresponding to one of the ID numbers may be outputted from the voice synthesizer 21a. For example, when the voice identifier 21b (refer to FIG. 2) receives a reply "Yes" after questioning that "Are you Mr. xxx ?", the integration processor 205 (refer to FIG. 7) identifies the target object as the "Mr. xxx". Also, when the voice identifier 21b (refer to FIG. 2) receives a reply "No", the integration processor 205 (refer to FIG. 7) controls the voice synthesizer 21a to output a name corresponding to another ID number from the voice synthesizer 21a. For example, when the voice identifier 21b (refer to FIG. 2) receives a reply "Yes" after questioning that "Are you Mr. AAA ?", the integration processor 205 (refer to FIG. 7) can identify the target object as the "Mr. AAA".

Second Embodiment

Figure 14:
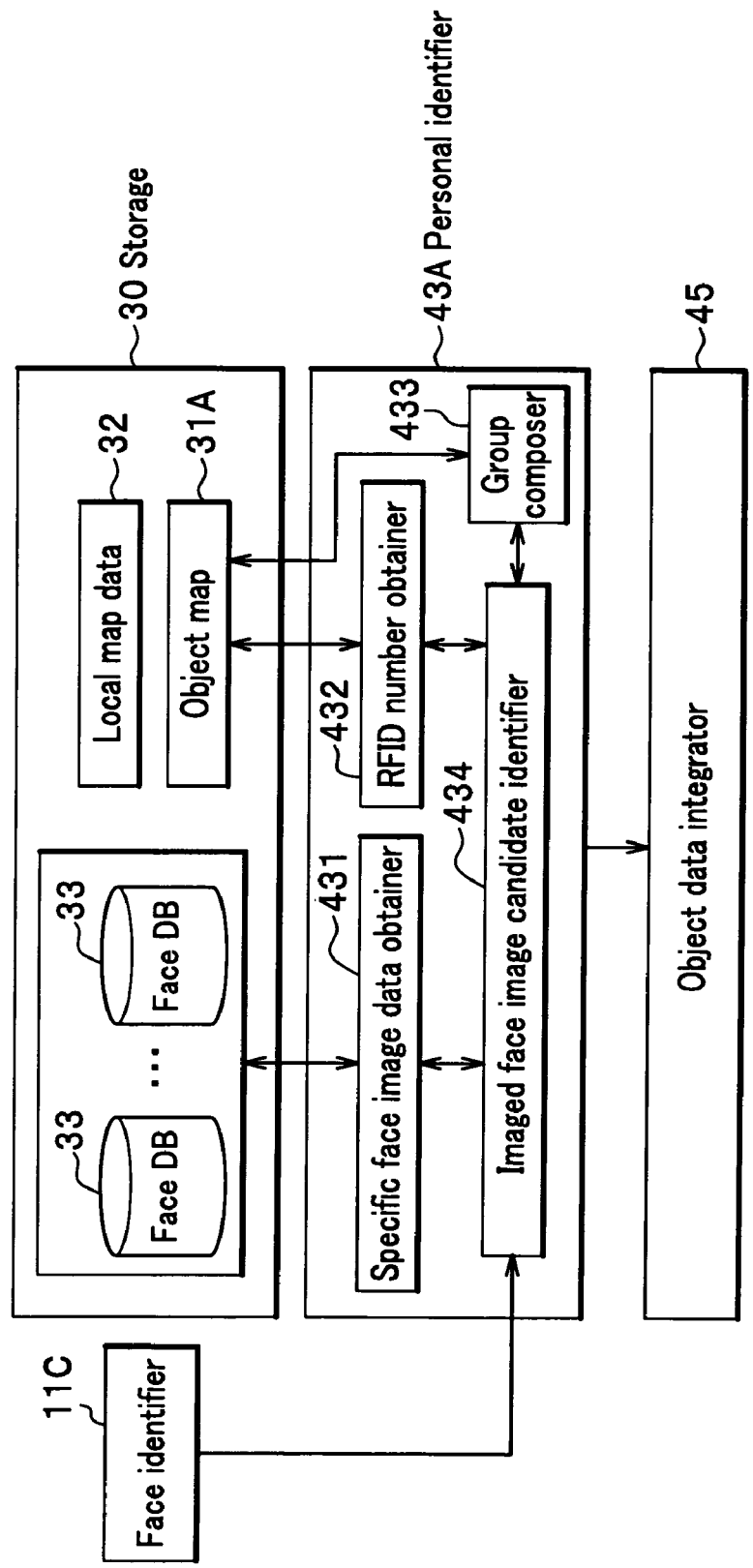
FIG. 14 is a block diagram showing a configuration of a personal identifier of a target object detection apparatus according to a second embodiment of the present invention.

Next, a target object detection apparatus according to a second embodiment of the present invention will be explained by referring to FIG. 14 to FIG. 19. The target object detection apparatus according to the second embodiment identifies a target object D imaged by using an object map prepared in the object data integrator 45 of the controller 40. FIG. 14 is a block diagram showing a configuration of a personal identifier of the target object detection apparatus according to the second embodiment. Meanwhile, in the second embodiment, the target object detection apparatus according to the second embodiment is configured with components of the robot R in the first embodiment except the autonomous travel controller 50. Identical components with those of the first embodiment are given the same reference number in the robot.

[Configuration of Target Object Detection Apparatus]

A storage 30 (target object information storing means) stores an object map 31A, a local map data 32, and a face DB (face database) 33.

Figure 15:
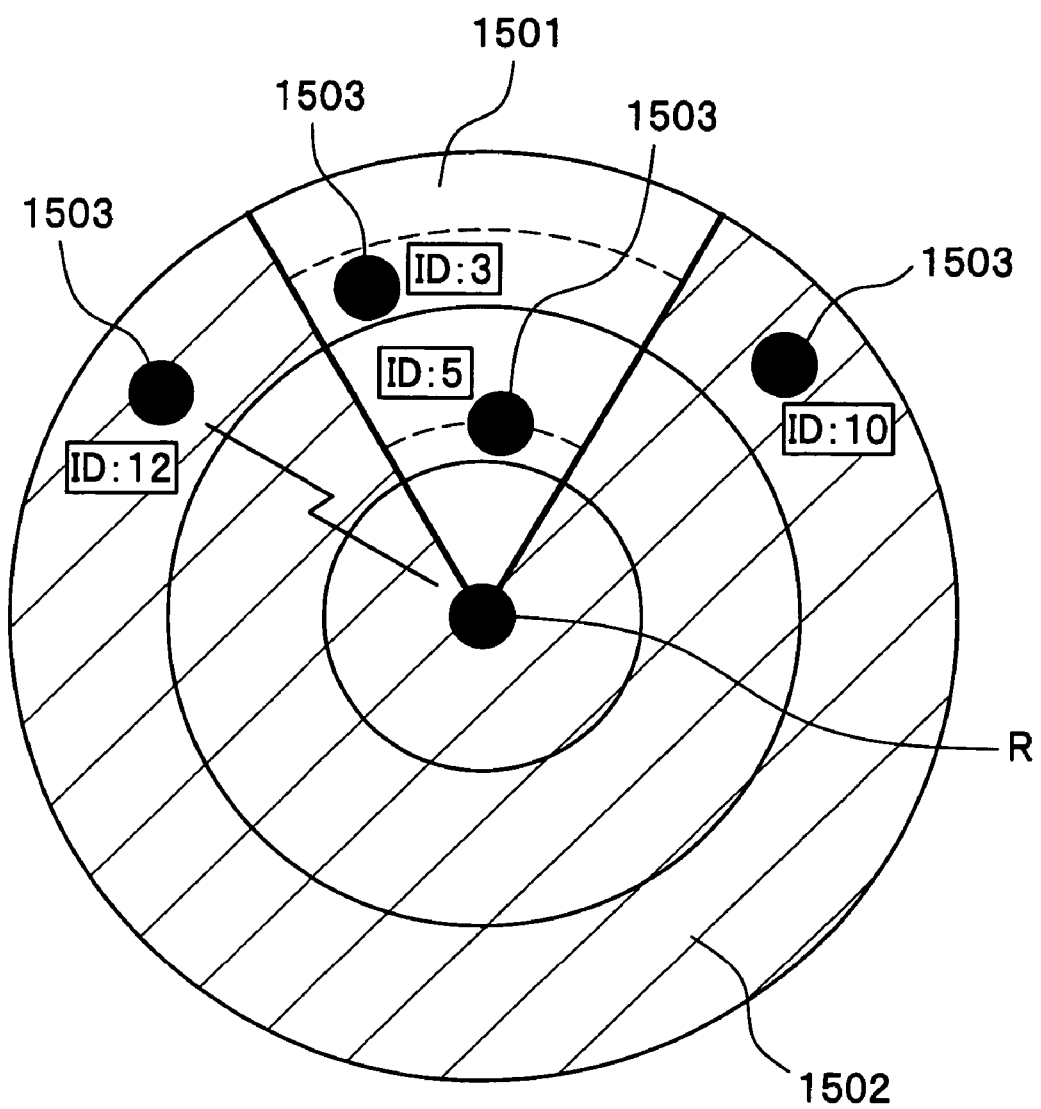
FIG. 15 is an illustration for explaining a visual field of a camera of a robot according to the second embodiment.

Here, the object map 31A will be explained by referring to FIG. 15 and FIG. 16. FIG. 15 is an illustration for explaining a visual field of a camera of the robot according to the second embodiment. FIG. 16 is an illustration for explaining the object map according to the second embodiment.

As shown in FIG. 15, the robot R is located at a center of a given area. The camera of the robot R has a visual field 1501 in front of the robot R (upper part in FIG. 15), and can not image an object existing in a non-visual field 1502 (hatching area). As shown in FIG. 15, four objects (for example, persons) 1503 exist around the robot R as a target object D. The objects 1503 whose ID are "3" and "5" among the four objects are located within the visual field 1501, and the objects 1503 whose ID are "10" and "12" are located in the non-visual field 1502. Hereinafter, for simplification, the visual field 1501 corresponds to one RFID position (for example, P1, refer to FIG. 4).

(Example of Object Map Content)

As shown in FIG. 16, the object map 31A is similar to the object map 31 shown in FIG. 8, and contains a plurality of data by time 1601 (hereinafter, referred to as card 1601). The card 1601 comprises a count (time information), posture data and a camera angle, RFID data 1602, a RFID data life count 1603, and a table.

The RFID data 1602 is an RFID number (RFID data) documented in an RFID tag T existing in the surrounding of the robot R. As shown in FIG. 15, when four objects 1503 exist in the surrounding of the robot R, "3, 5, 10, 12" are stored in each RFID tag T.

The RFID data life count 1603 is an elapsed time (count) on the object map 31A of the RFID number documented in the RFID tag T which exists in the surrounding of the robot R. The RFID data life count 1603 is reset at every moment of data input to the object map 31A. On the other hand, if there is no data input, the count increases, and if the count exceeds a predetermined value, the RFID data 1602 is deleted from the object map 31A. As shown in FIG. 16, for example, if the RFID data is "3", the RFID data life count is "0", and if the RFID data is "5", the RFID data life count is "4". These indicate that data has been just inputted from the RFID tag T of ID (RFID number) "3", and the count has proceeded "4" after a data input from the RFID tag T of ID "5", respectively.

In the table of the card 1601, a plurality of items characterizing the object are prepared. Face positions 1604 and 1605 are coordinate data outputted from the face identifier 11c, and expressed with a position coordinate (x, y) of the face on a camera image.

A face ID is data outputted from a personal identifier 43A, and a face certainty 1606 is a certainty of the face ID of an object number. The face ID is expressed with an identification number of a face DB33 (refer to FIG. 14) which stores a specific image data of the face of a person. The face certainty is expressed based on a degree of similarity computed by the personal identifier 43A, and complete matching is set to be 100%. Meanwhile, the similarity as it is may be used as the face certainty. In addition, a DFFC (Distance From Face Class) value may be used as the face certainty. In this case, as the DFFC value becomes small, the certainty of the face ID of the object number is increased.

The face ID and the face certainty 1606 are configured to be able to store a plurality of records as a candidate against one object (or the object number). In FIG. 16, three candidates can be stored for the face ID and the face certainty 1606, and two candidates are recorded.

The RFID number is an identification number of a person (object) documented in the RFID tag T, and the RFID certainty 1607 is a certainty of the RFID number of the object number. The RFID number is outputted from the target detector 70. The RFID certainty is a certainty of the data (identification number) of the RFID number, and computed using the aforementioned formula (1) by the certainty computer 214.

The RFID number and the RFID certainty 1607 are configured to be able to store a plurality of records as a candidate against one object (or the object number) with a similar manner to the case of the face ID and the face certainty 1606.

A human ID 1608 is an identification number of a person (object) determined by the integration processor 205 based on the face ID and the RFID number. Meanwhile, the integration processor may determine the human ID 1608 by using not only a current card 1601 but also resumes of past several frames.

A human ID certainty 1609 is a certainty of the identification number of the object determined by the integration processor 205 based on the face certainty and the RFID certainty.

As shown in FIG. 14, a plurality of face DBs 33 are stored in the storage 30 by person. The face DB 33 is a specific face image which was imaged in advance, and obtained from the management computer 3 through the radio communicator 60.

(Configuration of Personal Identifier)

A personal identifier (image identification means) 43A searches a specific face image data in the storage 30 to be compared with face data outputted from the face identifier 11c based on position information of a face position outputted from the face identifier 11c and the object map 31A. The personal identifier 43A includes, as shown in FIG. 14, a specific face image data obtainer (image information obtaining means) 431, an RFID number obtainer (read identification information obtaining means) 432, a group composer (group composing means) 433, and an imaged face image candidate identifier (imaged face image candidate identifying means) 434.

The specific face image data obtainer (image information obtaining means) 431 obtains specific face image data, which has a face ID corresponding to the RFID number belonging to a group composed by the group composer 433, from the face DB 33 of the storage 30.

The RFID number obtainer (read identification information obtaining means) 432 obtains position information of face position of the target object D imaged by the camera C from the imaged face image candidate identifier 434. Then, the RFID number obtainer 432 obtains the candidate who has the RFID number more than 1 from the object map 31A based on the position information of the obtained face position, and outputs it to the imaged face image candidate identifier 434.

The group composer (group composing means) 433 implements grouping of the candidates having the RFID numbers corresponding to a plurality of objects which may be a candidate of the target object D, based on the object map 31A under control of the imaged face image candidate identifier 434, and outputs the result to the imaged face image candidate identifier 434. The group composer (group composing means) 433 reads all RFID numbers (identification number) stored in the RFID data 1602 of the object map 31A, and divides them into two groups. In the embodiment, the group composer (group composing means) 433 divides the RFID numbers into a first group comprising RFID numbers whose faces were identified by the face identifier 11c, and a second group comprising RFID numbers except the first group.

The imaged face image candidate identifier (imaged face image candidate identifying means) 434 controls the specific face image data obtainer 431, the RFID number obtainer 432, and the group composer 433. In addition, the imaged face image candidate identifier 434 evaluates whether or not a difference between a characteristic parameter outputted from the face identifier 11c and a characteristic parameter of the specific face image data obtained by the specific face image data obtainer 431 is no more than a threshold value, and computes a face certainty when the difference is no more than the threshold value.

Practically, the imaged face image candidate identifier 434 evaluates whether or not the difference between the characteristic parameters is no more than a first threshold value for the first group, and computes a face certainty of face ID corresponding to the specific face image data of the characteristic parameter if the difference is no more than the first threshold value. Further, when the difference between the characteristic parameters is more than the first threshold value, the imaged face image candidate identifier 434 evaluates whether or not the difference between the characteristic parameters is no more than a second threshold value for the second group, and computes the face certainty of face ID corresponding to the specific face image data which has the characteristic parameter if the difference is no more than the second threshold value. In the embodiment, the second threshold value is set to be smaller than the first threshold value. Meanwhile, the second threshold value may be set to be equal to the first threshold value. In this case, when the difference between the characteristic parameters within the second group is no more than the second threshold value, the imaged face image candidate identifier 434 computes a final face certainty by multiplying a constant $\alpha$ ($0<\alpha<1$) to the computed face certainty after computing the face certainty of the face ID.

[Operation of Target Object Detection Apparatus]

Figure 17:
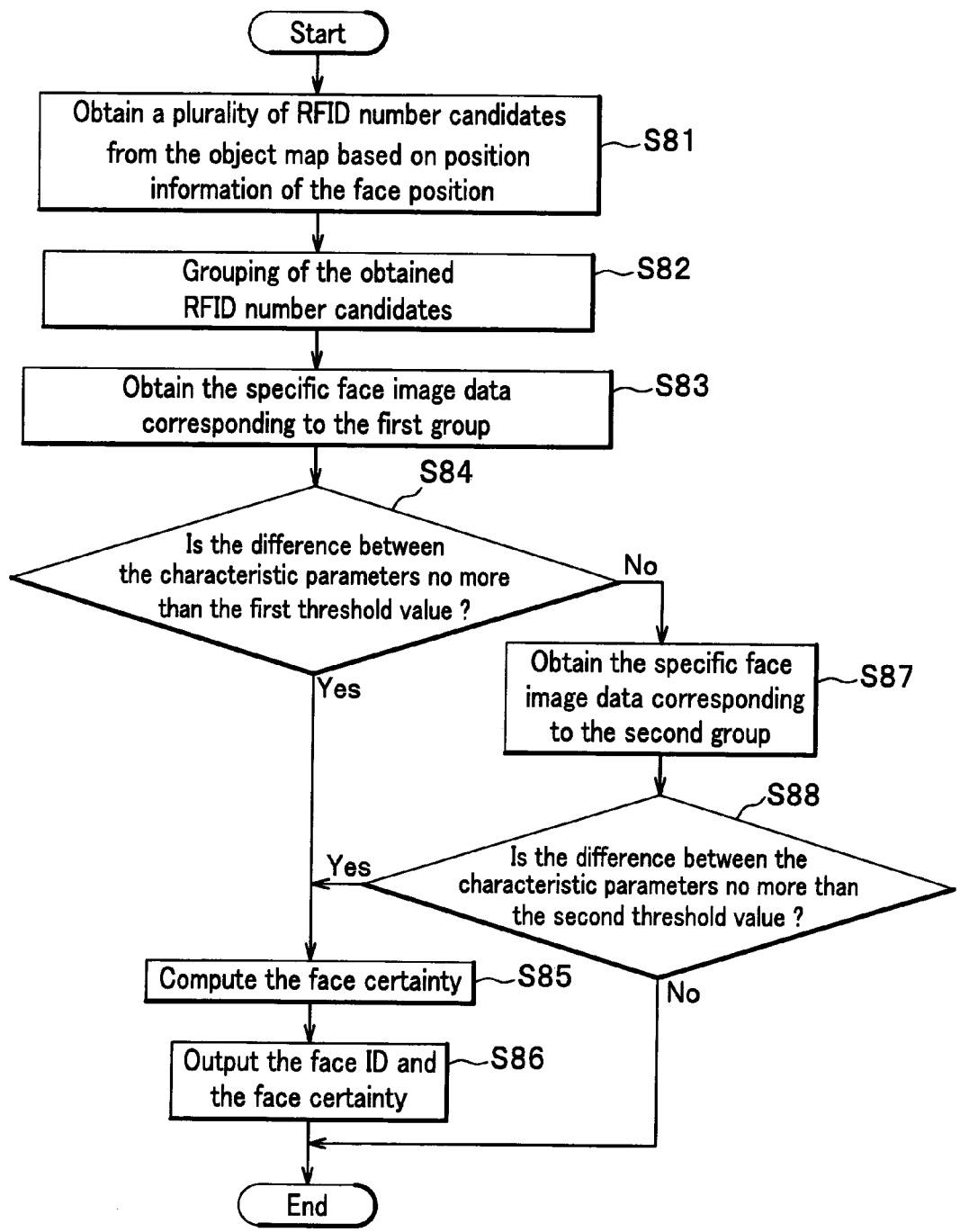
FIG. 17 is a flow chart showing an operation of a personal identifier shown in FIG. 14.

Next, an operation of the target object detection apparatus according to the second embodiment will be explained. The operation is identical with that of the target object detection apparatus according to the first embodiment except an operation of the personal identifier 43A. Hereinafter, the operation of the personal identifier 43A will be explained by referring to FIG. 17 to FIG. 19. FIG. 17 is a flowchart showing the operation of the personal identifier shown in FIG. 14. FIG. 18A is an illustration for explaining the obtained data, and FIG. 18B is an illustration for explaining an example of the groups in the operation of the personal identifier, respectively. Further, FIG. 19 is an illustration showing an example of a face certainty computed by a personal identifier.

First, the personal identifier 43A obtains a plurality of RFID number candidates from the object map based on position information of the obtained face position, using the RFID number obtainer 432 (step S81). Practically, when an object (person) 1503 of the ID "3" exemplified in FIG. 15 is assigned a first target object, the RFID number obtainer 432 determines that the object number of the first target object is, for example, "0", based on the face position of the object 1503 and a card 1601 (object map 31A) exemplified in FIG. 16. Similar to this, when an object (person) 1503 of the ID "5" exemplified in FIG. 15 is assigned to a second target object, the RFID number obtainer 432 determines that the object number of the second target object is, for example, "1", based on the face position of this object 1503 and the card 1601 (object map 31A) exemplified in FIG. 16.

In the card 1601 (object map 31A) exemplified in FIG. 16, when the object number is "0", data of the ID "3" and the certainty "50%" are documented in a first candidate field of the RFID number and the RFID certainty 1607, and data of the ID "5" and the certainty "50%" are also documented in a second candidate field of the RFID number and the RFID certainty 1607. Similar to this, when the object number is "1", data of the ID "3" and the certainty "50%" are documented in a first candidate field of the RFID number and the RFID certainty 1607, and data of the ID "5" and the certainty "50%"

are also documented in a second candidate field. The RFID number obtainer 432 obtains these data, and as shown in FIG. 18A, stores in a buffer (not shown) as a database 1801.

Then, the person identifier 43A implements grouping of candidates of the obtained RFID numbers (step S82) by using the group composer 433. Practically, the group composer 433 assigns the ID "3" and ID "5" which are stored in the buffer (not shown) to the first group. Here, in the case of the RFID data 1602 of the card 1601 exemplified in FIG. 16, objects of the ID "10" and ID "12" exist in the surrounding of the robot R other than the ID "3" and ID "5". Therefore, the group composer 433 assigns the ID "10" and ID "12" to the second group. Following to this, the group composer 433 stores the database 1811 which stores information of the first group and the second group into the buffer (not shown).

The personal identifier 43A obtains specific face image data corresponding to the first group from the face DB 33 of the storage 30 by using the specific face image data obtainer 431 (step S83). That is, the personal identifier 43A obtains the specific face image data corresponding to the ID "3" and "5" of the first group from the storage 30. Then, the personal identifier 43A evaluates whether or not a difference between a characteristic parameter outputted from the face identifier 11c and a characteristic parameter of the specific face image data corresponding to the first group by using the imaged face image candidate identifier 434 (step S84). When the difference between the characteristic parameters is no more than a first threshold value (step S84: Yes), the imaged face image candidate identifier 434 computes a face certainty of the face ID corresponding to the specific face image data which has the characteristic parameter (step S85). Practically, the imaged face image candidate identifier 434 writes the face ID and the face certainty in a first candidate field and a second candidate field of the face ID and the face certainty 1606 of the database 1801 shown in FIG. 18A. With the above process, as shown in FIG. 19, a database 1901 is prepared. Further, as shown in FIG. 18B, the personal identifier 43A outputs the face ID and face certainty of each candidate to the object data integrator 45 by using the imaged face image candidate identifier 434 (step S86).

When the difference between the characteristic parameters is more than the first threshold value (step S84: No), the personal identifier 43A obtains the specific face image data corresponding to the second group from the face DB 33 of the storage 30 by using the specific face image data obtainer 431 (step S87). That is, in this example, the specific face image data obtainer 431 obtains the specific face image data corresponding to the ID "10" and ID "12" of the second group from the storage 30. Then, the personal identifier 43A evaluates whether or not a difference between a characteristic parameter outputted from the face identifier 11c and that of the specific face image data corresponding to the second group by using the imaged face image candidate identifier 434 (step S88). When the difference between the characteristic parameters is no more than a second threshold value (step S88: Yes), the imaged face image candidate identifier 434 proceeds to step S85. On the other hand, when the difference between the characteristic parameters is more than the second threshold value (step S88: No), the personal identifier 43A terminates the processing.

Meanwhile, following to the step S86, the object data integrator 45 generates a human ID (integrated ID data) based on the face ID (personal data) and the RFID number (RFID data). This process is similar to the process explained in the first embodiment. However, in this example, two face ID candidates exist for a single object, as well as two RFID number candidates. Therefore, in the second embodiment, the integration processor 205 of the object data integrator 45 implements the following processing.

For example, in the database 1901 shown in FIG. 19, when the object number is "0", data of the ID "3" and the certainty "50 (%)" are stored in a first candidate field, and data of the ID "5" and the certainty "50 (%)" are also stored in a second candidate field of the RFID number and the RFID certainty 1607, respectively. When the object number is "1", the stored number in each field is identical with the above. Therefore, the two objects can not be distinguished by using only the single item of the RFID number and the RFID certainty 1607. However, in the database 1901 shown in FIG. 19, when the object number is "0", data of the ID "3" and the certainty "60 (%)" are stored in a first candidate field of the face ID and the face certainty 1606, and data of the ID "5" and the certainty "40 (%)" are also stored in a second candidate field of the face ID and the face certainty 1606. Similar to this, when the object number is "1", data of the ID "3" and the certainty "80 (%)" are stored in the first candidate field of the face ID and the face certainty 1606, and data of the ID "5" and the certainty "20 (%)" are also stored in the second candidate field of the face ID and the face certainty 1606. Therefore, in this case, both the first candidate of object number "0" and the first candidate of object number "1" are the object (person) 1503 with the ID "3". However, the first candidate of object number "1" has a higher certainty than that of the object number "0".

Therefore, the integration processor 205 identifies a person of the object number "1" as the object (person) 1503 of the ID "3", depending on a view point of the face image. Then, the integration processor 205 assigns "3" to the human ID (integrated ID data) on the temporary map corresponding to the object map 31A shown in FIG. 16, and also assigns "80 (%)" to the certainty. Similar to the above, the integration processor 205 identifies a person of the object number "0" as the second candidate, that is, the object (person) 1503 of the ID "5", and assigns "5" to the human ID (integrated ID data) and "40 (%)" to the certainty. Then, the object data integrator 45 generates the card 1601 shown in FIG. 16 by writing the temporary map into the object map 31A at a predetermined timing by using the write controller 206. In addition, the integration processor 205 may finally determine the certainty of the human ID by using the resume of the old card 1601.

As described in the above, according to the second embodiment, the human ID (integrated ID data) can be generated based on the face ID (personal data) and the RFID number (RFID data) even if a plurality of RFID number candidates and a plurality of face ID candidates exist for a single object. Therefore, a recognition rate (identification rate) of the object can be improved. Meanwhile, the group composer 433 of the personal identifier 43A is not the essential component, and, it can be neglected. In this case, each processing at steps S82, S87, and S88 in the flowchart shown in FIG. 17 can be also neglected.

However, in the case below, since the identification rate of the target object D can be improved by using the group composer 433, it is preferable that the personal identifier 43A is provided with the group composer 433. The RFID tag T may receive an infrared light which has changed its original emission direction (direction changed infrared) by reflection at, for example, a wall in the surrounding, depending on, for example, (1) a distance from the robot R to the RFID tag T, (2) an obstacle existing between the robot R and the RFID tag T, and (3) a direction of the RFID tag T against the robot R. If the RFID tag T, which has received the infrared light of which direction was changed, returns a reception report signal to the robot R (target detector 70), the target detector 70 of the robot R mis-recognizes the direction where the RFID tag T really exists by the direction check signal (emitter ID) included in the reception report signal. That is, the reading error may be caused in some case. Even in the case, the personal identifier 43A considers not only a candidate having an RFID number obtained from the object map 31A based on the face position, but also all detectable RFID numbers existing in the surrounding of the robot R. As a result, the identification rate of the target object is increased.

The preferred embodiments of the present invention have been explained. However, the present invention is not limited to the embodiments described above. Various modifications are available without departing from the spirit of the present invention. For example, by installing frequency ID means which identifies the target object by a frequency difference of a voice outputted from the target object, a target object may be identified based on the personal identification, the RFID tag, and the frequency ID means.

In addition, in a target object detection apparatus according to the present invention, the target object can be any of another robot and an object other than a person (human), and also they can be a movable object.

Furthermore, the target object detection apparatus according to the present invention may be applicable, for example, to various mobile objects such as automobiles other than the biped walking robot. In this case, for example, the system may be applied to automatic opening of the door of a mobile object by evaluating whether or not a person who is coming close to the mobile object is the owner (driver).

What is claimed is:

1. A target object detection apparatus for identifying a target object by using at least a camera and a wireless tag provided on the target object which exists at outside of the target object detection apparatus, comprising:
    a target detector for reading first identification information documented in the wireless tag;
    an image processor for extracting first image information of the target object imaged by the camera;
    a personal identifier for identifying an imaged target object by comparing the first image information extracted by the image processor and second image information specific to the target object;
    an integration processor for determining third identification information of the target object based on at least second identification information identified by the personal identifier and the first identification information read by the target detector; and
    a certainty computer for computing a first certainty of the first identification information read by the target detector,
    wherein the personal identifier computes a second certainty of the second identification information identified by the personal identifier, and
    wherein when the second identification information identified by the personal identifier and the first identification information read by the target detector for a single target object are different, the integration processor determines the third identification information of the target object based on the second certainty computed by the personal identifier and the first certainty computed by the certainty computer.

2. The target object detection apparatus according to claim 1, further comprising:
    a voice source determiner for extracting a voice source position from a voice of the target object,
    wherein the integration processor determines the third identification information of the target object based on the second identification information identified by the personal identifier, the first identification information read by the target detector, and the voice source position extracted by the voice source determiner.

3. The target object detection apparatus according to claim 2, further comprising:
    a certainty computer for computing a first certainty of the first identification information read by the target detector,
    wherein the personal identifier computes a second certainty of the second identification information identified by the personal identifier, and
    wherein when the second identification information identified by the personal identifier and the first identification information read by the target detector for a single target object are different, the integration processor determines the third identification information of the target object based on the second certainty computed by the personal identifier and the first certainty computed by the certainty computer.

4. The target object detection apparatus according to claim 1, further comprising:
    a storage for storing position information of the target object which is identified from the first image information extracted by the image processor and the third identification information determined by the integration processor, by time and target objects.

5. The target object detection apparatus according to claim 2, further comprising:
    a storage for storing position information of the target object which is identified from the first image information extracted by the image processor and the third identification information determined by the integration processor, by time and target objects.

6. The target object detection apparatus according to claim 1, further comprising:
    a storage for storing position information of the target object which is identified from the first image information extracted by the image processor and the third identification information determined by the integration processor, by time and target objects.

7. The target object detection apparatus according to claims 2, further comprising:
    a storage for storing position information of the target object which is identified from the first image information extracted by the image processor and the third identification information determined by the integration processor, by time and target objects.

8. The target object detection apparatus according to claim 1, further comprising:
    one or more than one database for storing image information corresponding to the second identification information which identifies the target object,
    wherein the personal identifier comprises
    specific face image data obtainer for obtaining the image information from the one or more than one database as the second image information specific to the target object, and
    an imaged face image candidate identifier for comparing at least one image information obtained by the specific face image data obtainer and the first image information extracted by the image processor, and based on a comparison of both the image information, prioritizing the second identification information corresponding to the at least one image information obtained, and identifying prioritized second identification information as a candidate of the imaged target object.

9. The target object detection apparatus according to claim 1, further comprising:
one or more than one database for storing image information corresponding to the second identification information identifying the target object,
wherein the personal identifier comprises
a specific face image data obtainer for obtaining the image information from the one or more than one database as the second image information specific to the target object, and
an imaged face image candidate identifier for comparing at least one image information obtained by the specific face image data obtainer and the first image information extracted by the image processor, and based on a comparison of both the image information, prioritizing the second identification information corresponding to the at least one image information obtained, and identifying prioritized second identification information as a candidate of the imaged target object.

10. The target object detection apparatus according to claim 2, further comprising:
one or more than one database for storing image information corresponding to the second identification information identifying the target object,
wherein the personal identifier comprises
a specific face image data obtainer for obtaining the image information from the one or more than one database as the second image information specific to the target object, and
an imaged face image candidate identifier for comparing at least one image information obtained by the specific face image data obtainer and the first image information extracted by the image processor, and based on a comparison of both the image information, prioritizing the second identification information corresponding to the at least one image information obtained, and identifying prioritized second identification information as a candidate of the imaged target object.

11. The target object detection apparatus according to claim 8, further comprising:
a target detector for detecting first position information of the wireless tag; and
a storage for storing second position information of a target object identified by the imaged face image candidate identifier, the second identification information prioritized by the personal identifier, the first identification information read by the target detector, and the third identification information determined by the integration processor, by time and target objects,
wherein the personal identifier, further comprises
an RFID number obtainer for obtaining at least one first identification information which is read by the target detector from the storage, based on the second position information of the target object identified by the first image information extracted by the image processor,
wherein the specific face image data obtainer obtains the second image information corresponding to the first identification information obtained by the RFID number obtainer, as the second image information specific to the target object.

12. The target object detection apparatus according to claim 9, further comprising:
a target detector for detecting first position information of the wireless tag; and
a storage for storing second position information of a target object identified by the imaged face image candidate identifier, the second identification information prioritized by the personal identifier, the first identification information read by the target detector, and the third identification information determined by the integration processor, by time and by target objects,
wherein the personal identifier, further comprises
an RFID number obtainer for obtaining at least one first identification information which is read by the target detector from the storage, based on the second position information of the target object identified by the first image information extracted by the image processor,
wherein the specific face image data obtainer obtains the second image information corresponding to the first identification information obtained by the RFID number obtainer, as the second image information specific to the target object.

13. The target object detection apparatus according to claim 10, further comprising:
a target detector for detecting first position information of the wireless tag; and
a storage for storing second position information of a target object identified by the imaged face image candidate identifier, the second identification information prioritized by the personal identifier, the first identification information read by the target detector, and the third identification information determined by the integration processor, by time and target objects,
wherein the personal identifier, further comprises
an RFID number obtainer for obtaining at least one first identification information which is read by the target detector from the storage, based on the second position information of the target object identified by the first image information extracted by the image processor,
wherein the specific face image data obtainer obtains the second image information corresponding to the first identification information obtained by the RFID number obtainer, as the second image information specific to the target object.

14. The target object detection apparatus according to claim 11,
wherein the personal identifier, further comprises:
a group composer for obtaining all of the first identification information read by the target detector, and dividing all of the first identification information into a first group which comprise the second identification information of the imaged target object and a second group which comprise information other than the second identification information of the imaged target object,
wherein the specific face image data obtainer obtains the second image information corresponding to the first identification information by each identification information which belong to each group formed by the group composer as the second image information specific to the target object, and
wherein the imaged face image candidate identifier compares the second image information obtained by the specific face image data obtainer and the first image information extracted by the image processor by groups grouped by the group composer.

15. A robot provided with the target object detection apparatus according to claim 1, wherein the robot is capable of autonomous traveling control according to a target object identified by the third identification information of the target object detection apparatus, as well as conducting a predetermined traveling based on an external command.

16. The robot provided with the target object detection apparatus according to claim 15,
wherein a content of the external command comprises identification information and position information of a requester requesting a delivery of goods, and identification information and position information of an addressee who receives the goods, and
wherein the predetermined traveling comprises a search and identification of the requester, a reception of the good from the requester, a search and an identification of the addressee, and handing of the good received from the requester to the addressee.

17. The robot provided with the target object detection apparatus according to claim 16, further comprising:
a voice synthesizer for producing voices based on conversation data specific to the requester and the addressee, respectively, when one of the requester and the addressee is identified; and
a voice identifier for identifying a personal voice.

* * * * *